United States Patent
Edge et al.

(10) Patent No.: US 11,452,061 B2
(45) Date of Patent: Sep. 20, 2022

(54) SUPPORT OF CONTROL PLANE POSITIONING METHODS WITH A USER PLANE LOCATION SOLUTION

(71) Applicant: QUALCOMM Incorporated, San Diego, CA (US)

(72) Inventors: Stephen William Edge, Escondido, CA (US); Ie-Hong Lin, Cupertino, CA (US); Srigouri Kamarsu, Cupertino, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/183,270

(22) Filed: Feb. 23, 2021

(65) Prior Publication Data

US 2021/0274458 A1    Sep. 2, 2021

Related U.S. Application Data

(60) Provisional application No. 63/000,442, filed on Mar. 26, 2020, provisional application No. 62/982,635, filed on Feb. 27, 2020.

(51) Int. Cl.
*H04W 64/00* (2009.01)
*H04L 5/00* (2006.01)
*H04W 8/08* (2009.01)

(52) U.S. Cl.
CPC .......... *H04W 64/00* (2013.01); *H04L 5/0048* (2013.01); *H04W 8/08* (2013.01)

(58) Field of Classification Search
CPC ...... H04W 64/00; H04W 8/08; H04L 5/0048; G01S 5/02
See application file for complete search history.

(56) References Cited

U.S. PATENT DOCUMENTS

| 8,738,041 B2 * | 5/2014 | Siomina | H04W 64/00 455/456.2 |
| 2011/0256875 A1 | 10/2011 | Edge et al. | |

OTHER PUBLICATIONS

Edge S., et al., "SUPL 2.0 TS NR Position Methods", OMA-LOC-2020-0007R01-CR_SUPL2.0_TS_ULP_NR_Position_Methods, Open Mobile Alliance (OMA), 4330 La Jolla Village Dr., Suite 110 San Diego, CA 92122, USA, May 30, 2020 (May 30, 2020), XP064193846, 36 Pages, Retrieved from the Internet: URL:ftp/Public_documents/LOC/2020/ [retrieved on May 31, 2020] Page 1.

(Continued)

*Primary Examiner* — Kabir A Timory
(74) *Attorney, Agent, or Firm* — Weaver Austin Villeneuve & Sampson LLP

(57) ABSTRACT

A user equipment (UE) and a Secure User Plane Location (SUPL) Location Platform (SLP) support a SUPL positioning session for at least one uplink or uplink-downlink position method, such as uplink Angle of Arrival or multi-Round Trip Time. To support SUPL positioning for uplink or uplink-downlink position methods, the UE provides an identifier for a serving Access and Mobility Management Function (AMF) and an identifier for the UE to the SLP in a SUPL message. The SLP may exchange positioning messages with a serving base station for the UE using the identifier for the serving AMF and the identifier for the UE. The exchange of positioning messages may enable the SLP to request the serving base station to instigate transmission of uplink positioning reference signals by the UE which may be a key enabler for an uplink or uplink-downlink position method.

54 Claims, 11 Drawing Sheets

(56) References Cited

OTHER PUBLICATIONS

International Search Report and Written Opinion—PCT/US2021/019458—ISA/EPO—May 27, 2021.
Qualcomm Incorporated: "SUPL Support for NR Positioning Methods", 3GPP Draft, R2-2010092, 3GPP TSG-RAN WG2 Meeting #112-e, 3RD Generation Partnership Project (3GPP), Mobile Competence Centre, 650, Route Des Lucioles, F-06921 Sophia-Antipolis Cedex, France, vol. Ran WG2, No. Electronic, Nov. 2, 2020-Nov. 13, 2020, Oct. 23, 2020 (Oct. 23, 2020), XP051942797, 7 Pages, Retrieved from the Internet: URL:https://ftp.3gpp.org/tsg_ran/WG2_RL2/TSGR2_112-e/Docs/R2-2010092.zip, R2-2010092_(CR 38305 SUPL support).docx [retrieved-on Oct. 23, 2020] Page 1 Page 7.

\* cited by examiner

SUPPORT OF CONTROL PLANE POSITIONING METHODS WITH A USER PLANE LOCATION SOLUTION

CLAIM OF PRIORITY UNDER 35 U.S.C. § 119

This application claims under 35 USC § 119 the benefit of and priority to U.S. Provisional Application No. 62/982,635, filed Feb. 27, 2020, and entitled "SUPPORT OF UPLINK AND UPLINK-DOWNLINK POSITIONING METHODS OVER USER PLANE SUPL," and U.S. Provisional Application No. 63/000,442, filed Mar. 26, 2020, and entitled "SUPPORT OF CONTROL PLANE POSITIONING METHODS WITH A USER PLANE LOCATION SOLUTION," each of which are assigned to the assignee hereof and are incorporated herein by reference in their entireties.

BACKGROUND

Field

Subject matter disclosed herein relates to estimation of a location of a mobile device and more particularly to location of a mobile device with a user plane location solution.

Information

The location of a mobile device, such as a cellular telephone, may be useful or essential to a number of applications including emergency calls, navigation, direction finding, asset tracking and Internet service. The location of a mobile device may be estimated based on information gathered from various systems and using different location solutions. One location solution, which has been defined by the Open Mobile Alliance (OMA), is known as Secure User Plane Location (SUPL) and employs signaling, conveyed at a user plane level, between a mobile device and a location server to coordinate the location of the mobile device. There are positioning methods, such as uplink and uplink-downlink positioning methods, that can be supported with a control plane location solution, but that may not be supportable with SUPL. It is desirable for these positioning methods to be also supportable with SUPL.

SUMMARY

A user equipment (UE) and Secure User Plane Location (SUPL) Location Platform (SLP) support SUPL positioning session for at least one uplink or uplink-downlink position method, such as uplink (UL) Angle of Arrival (AOA) or multi-Round Trip Time (RTT). To support SUPL positioning for uplink or uplink-downlink position methods, the UE provides an identifier for a serving Access and Mobility Management Function (AMF) and an identifier for the UE to a SLP in a SUPL message. The SLP may exchange positioning messages with a serving base station for the UE using the identifier for a serving AMF and the identifier for the UE. The SLP may further assign a Location Service (LCS) correlation identifier, which also may be used for exchange positioning messages with the serving base station.

In one implementation, a method performed by a user equipment (UE) for supporting location services for the UE, includes transmitting or receiving one or more messages to initiate a Secure User Plane Location (SUPL) positioning session with a SUPL Location Platform (SLP), the SUPL positioning session using at least one uplink or uplink-downlink position method; transmitting to the SLP an identifier for a serving Access and Mobility Management Function (AMF) for the UE and an identifier for the UE; receiving at least one message from a serving base station to configure and activate transmission of an uplink (UL) positioning reference signal (PRS) or a UL sounding reference signal (SRS); and performing the at least one uplink or uplink-downlink position method by transmitting the UL PRS or the UL SRS.

In one implementation, a user equipment (UE) configured for supporting location services for the UE, includes at least one wireless transceiver configured to wirelessly communicate with a wireless network; at least one memory; and at least one processor coupled to the at least one wireless transceiver and the at least one memory, the at least one processor configured to: transmit or receive one or more messages, via the at least one wireless transceiver, to initiate a Secure User Plane Location (SUPL) positioning session with a SUPL Location Platform (SLP), the SUPL positioning session using at least one uplink or uplink-downlink position method; transmit to the SLP, via the at least one wireless transceiver, an identifier for a serving Access and Mobility Management Function (AMF) for the UE and an identifier for the UE; receive at least one message from a serving base station to configure and activate transmission of an uplink (UL) positioning reference signal (PRS) or a UL sounding reference signal (SRS); and perform the at least one uplink or uplink-downlink position method by transmitting the UL PRS or the UL SRS.

In one implementation, a user equipment (UE) configured for supporting location services for the UE, the UE includes means for transmitting or receiving one or more messages to initiate a Secure User Plane Location (SUPL) positioning session with a SUPL Location Platform (SLP), the SUPL positioning session using at least one uplink or uplink-downlink position method; means for transmitting to the SLP an identifier for a serving Access and Mobility Management Function (AMF) for the UE and an identifier for the UE; means for receiving at least one message from a serving base station to configure and activate transmission of an uplink (UL) positioning reference signal (PRS) or a UL sounding reference signal (SRS); and means for performing the at least one uplink or uplink-downlink position method by transmitting the UL PRS or the UL SRS.

In one implementation, a non-transitory storage medium including program code stored thereon, the program code is operable to configure at least one processor in a user equipment (UE) for supporting location services for the UE, the program code comprising instructions to transmit or receive one or more messages to initiate a Secure User Plane Location (SUPL) positioning session with a SUPL Location Platform (SLP), the SUPL positioning session using at least one uplink or uplink-downlink position method; transmit to the SLP an identifier for a serving Access and Mobility Management Function (AMF) for the UE and an identifier for the UE; receive at least one message from a serving base station to configure and activate transmission of an uplink (UL) positioning reference signal (PRS) or a UL sounding reference signal (SRS); and perform the at least one uplink or uplink-downlink position method by transmitting the UL PRS or the UL SRS.

In one implementation, a method performed by a Secure User Plane Location (SUPL) Location Platform (SLP) for supporting location services for a user equipment (UE), includes transmitting or receiving one or more messages with the UE to initiate a SUPL positioning session, the SUPL positioning session using at least one uplink or uplink-downlink position method; receiving from the UE an identifier for a serving Access and Mobility Management Function (AMF) for the UE and an identifier for the UE; and performing the at least one uplink or uplink-downlink position method by transmitting or receiving one or more positioning messages with a serving base station for the UE through the serving AMF using the identifier for the serving AMF and the identifier for the UE.

In one implementation, a Secure User Plane Location (SUPL) Location Platform (SLP) configured for supporting location services for a user equipment (UE), includes at least one external interface configured to communicate with entities in a wireless network; at least one memory; and at least one processor coupled to the at least one external interface and the at least one memory, the at least one processor configured to: transmit or receive one or more, via the at least one external interface, messages with the UE to initiate a SUPL positioning session, the SUPL positioning session using at least one uplink or uplink-downlink position method; receive, via the at least one external interface, from the UE an identifier for a serving Access and Mobility Management Function (AMF) for the UE and an identifier for the UE; and perform, via the at least one external interface, the at least one uplink or uplink-downlink position method by transmitting or receiving one or more positioning messages with a serving base station for the UE through the serving AMF using the identifier for the serving AMF and the identifier for the UE.

In one implementation, a Secure User Plane Location (SUPL) Location Platform (SLP) configured for supporting location services for a user equipment (UE), the SLP includes means for transmitting or receiving one or more messages with the UE to initiate a SUPL positioning session, the SUPL positioning session using at least one uplink or uplink-downlink position method; means for receiving from the UE an identifier for a serving Access and Mobility Management Function (AMF) for the UE and an identifier for the UE; and means for performing the at least one uplink or uplink-downlink position method by transmitting or receiving one or more positioning messages with a serving base station for the UE through the serving AMF using the identifier for the serving AMF and the identifier for the UE.

In one implementation, a non-transitory storage medium including program code stored thereon, the program code is operable to configure at least one processor in a Secure User Plane Location (SUPL) Location Platform (SLP) configured for supporting location services for a user equipment (UE), the program code comprising instructions to: program code to transmit or receive one or more messages with the UE to initiate a SUPL positioning session, the SUPL positioning session using at least one uplink or uplink-downlink position method; program code to receive from the UE an identifier for a serving Access and Mobility Management Function (AMF) for the UE and an identifier for the UE; and program code to perform the at least one uplink or uplink-downlink position method by transmitting or receiving one or more positioning messages with a serving base station for the UE through the serving AMF using the identifier for the serving AMF and the identifier for the UE.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

Figure 1:
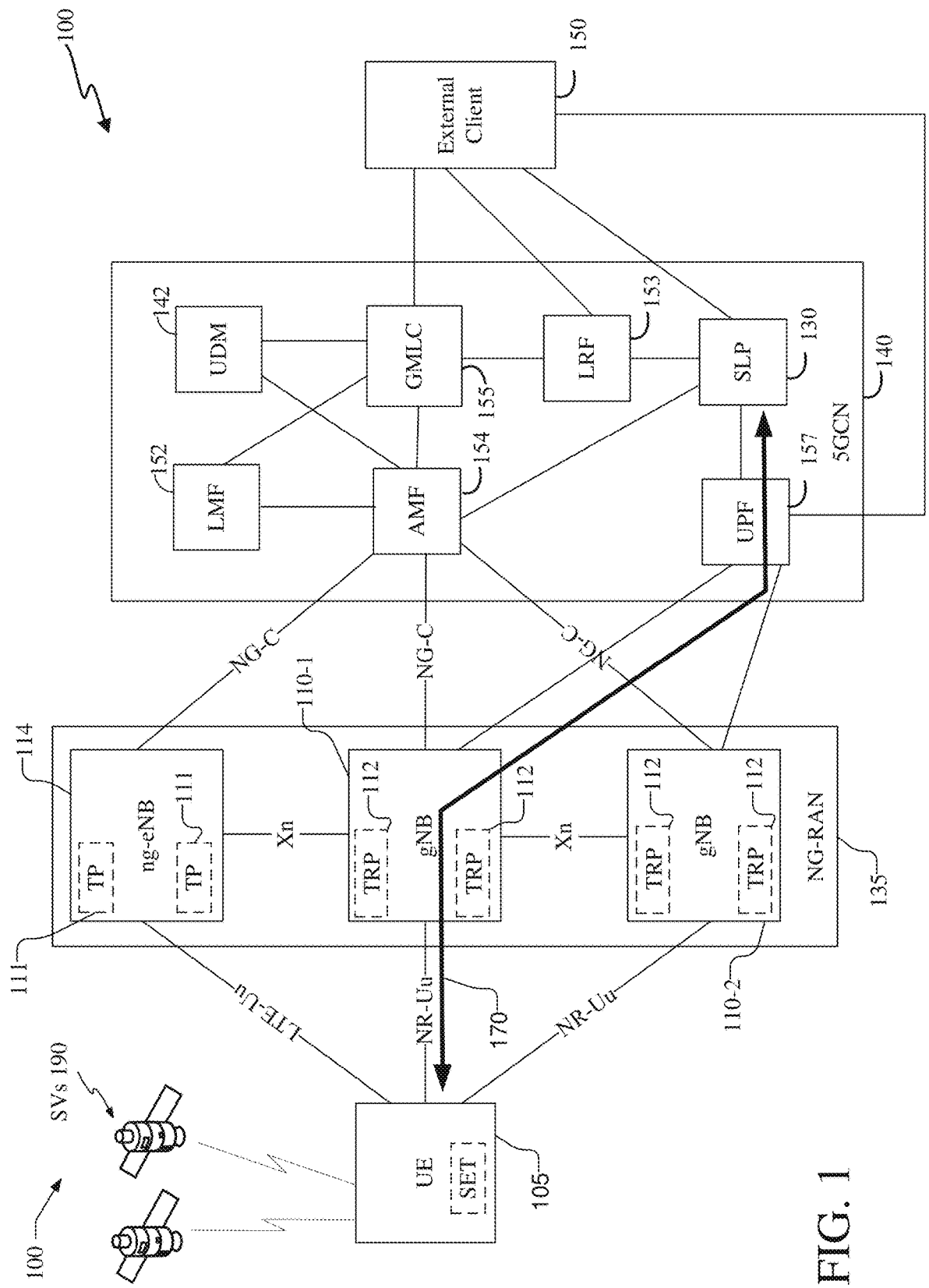
FIG. 1 is a system diagram illustrating certain features of a Fifth Generation (5G) communication system comprising a mobile device and a cellular network, in accordance with an implementation.

Reference is made in the following detailed description to the above accompanying drawings, which form a part hereof, wherein like numeric and alphanumeric labels may designate like parts throughout that are identical, similar and/or analogous. In addition, multiple instances of an element may be indicated by following a first number for the element with a letter or with a hyphen and a second number. For example, multiple instances of an element 110 may be indicated as 110-1, 110-2, 110-3 etc., or as 110a, 110b, 110c etc. When referring to such an element using only the first number, any instance of the element is to be understood (e.g. element 110 in the previous example would refer to any of the elements 110-1, 110-2 and 110-3 or to any of the elements 110a, 110b and 110c).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

To support positioning of a mobile device, two broad classes of location solution have been defined: control plane and user plane. With control plane (CP) location, signaling related to positioning and support of positioning may be carried over existing network (and mobile device) signaling interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for mobile devices that use radio access according to Global System for Mobile communications GSM (2G), Universal Mobile Telecommunications System (UMTS) (3G), Fourth Generation (4G) Long Term Evolution (LTE), and Fifth Generation (5G) New Radio (NR) and Wireless Local Area Network (WLAN). These solutions are defined in 3GPP Technical Specifications (TSs) 23.271 (common part for 2G-4G), 43.059 (GSM access), 25.305 (UMTS access), 36.305 (LTE access), and 23.273 and 38.305 (5G access). The Open Mobile Alliance (OMA) has similarly defined a UP location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE, NR or WLAN.

Both CP and UP location solutions may employ a location server (LS) to support positioning. The LS may be part of or accessible from a serving network or a home network for a user equipment (UE) or may simply be accessible over the Internet or over a local Intranet. If positioning of a UE is needed, an LS or a UE may initiate a session (e.g. a location session or a SUPL session) between the UE and the LS and coordinate location measurements by the UE and/or by a network and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from the UE, e.g., for position methods such as Assisted Global Navigation Satellite System (A-GNSS), Uplink (UL) Time Difference of Arrival (TDOA), Downlink (DL) TDOA, multi-cell Round Trip signal propagation Time (RTT) also referred as multi-RTT, UL angle of arrival (UL-AOA), DL angle of departure (DL-AOD), and/or Enhanced Cell ID (ECID). It is noted that Round Trip signal propagation Time (RTT) may also be referred to more simply as "Round Trip Time" which may also be abbreviated as RTT.

Assistance data may be provided to a UE (e.g. by a location server) and used by the UE to help acquire and measure signals, such as GNSS signals for A-GNSS and/or a Positioning Reference Signal (PRS) for DL-TDOA, or multi-RTT (e.g., by providing expected characteristics of these signals such as frequency, bandwidth, expected time of arrival, beam angles, signal coding, signal Doppler).

In a UE based mode of operation (also referred to as UE based positioning), assistance data may also or instead be used by a UE to help determine a location estimate for the UE from location measurements obtained by the UE (e.g., if the assistance data provides satellite ephemeris data in the case of A-GNSS positioning or base station locations and other base station characteristics such as PRS timing in the case of terrestrial positioning using DL-TDOA or multi-RTT).

In an alternative UE assisted mode of operation (also referred to as UE assisted positioning), a UE may return location measurements to an LS which may determine an estimated location of the UE based on these measurements and possibly based also on other known or configured data (e.g. satellite ephemeris data for A-GNSS location or base station characteristics including base station locations and possibly PRS timing in the case of terrestrial positioning using DL-TDOA or multi-RTT).

In another standalone mode of operation, a UE may make location related measurements without any positioning assistance data from an LS and may further compute a location or a change in location without any positioning assistance data from a LS. Position methods that may be used in a standalone mode include GPS and GNSS (e.g. if a UE obtains satellite orbital data from navigation data broadcast by GPS or GNSS satellites themselves) as well as sensors. It is noted that the terms "positioning assistance data", "location assistance data" and "assistance data" (AD) are used synonymously herein to refer to data which may be provided to a mobile device via broadcast (e.g. by a base station) or by point to point means (e.g. by an LS) to assist the mobile device to obtain location measurements (also referred to as positioning measurements) and/or to compute a location estimate from positioning measurements.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G (e.g. NR or WLAN)

access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with a serving or non-home network or if not associated with any network; (iii) an Emergency SLP (E-SLP) if supporting location for an emergency call initiated by the UE; or (iv) a visited SLP (V-SLP) if in or associated with a serving network or a current local area for a UE.

During a location session (also referred to as a positioning session), an LS and a UE may exchange messages defined according to some positioning protocol in order to coordinate stages necessary for the determination of an estimated location for the UE, such as DL PRS transmitted by the base station and measured by the UE and UL PRS or UL Sounding Reference Signals (SRS) for positioning transmitted by a UE and measured by the base station. Possible positioning protocols may include, for example, the LTE Positioning Protocol (LPP) defined by 3GPP in 3GPP TS 36.355 and TS 37.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains an embedded LPPe message. The combined LPP and LPPe protocols may be referred to as LPP/LPPe. LPP and LPP/LPPe may be used to help support the 3GPP control plane location solution for LTE, NR and WLAN access, in which case LPP or LPP/LPPe messages are exchanged between a UE and E-SMLC or LMF.

LPP or LPP/LPPe messages may be exchanged between a UE and E-SMLC via a serving Mobility Management Entity (MME) and a serving evolved NodeB (eNB) for the UE in the case of LTE access. LPP or LPP/LPPe messages may also be exchanged between a UE and LMF via a serving Access and Mobility management Function (AMF) and a serving NR NodeB (referred to as a gNB) for the UE in the case of NR or WLAN 5G access.

LPP and LPP/LPPe may also be used to help support the OMA SUPL solution for many types of wireless access that support IP messaging (such as LTE, NR and WLAN), where LPP or LPP/LPPe messages are exchanged between a SUPL Enabled Terminal (SET), which is the term used for a UE with SUPL, and an SLP, and may be transported within SUPL messages, such as a SUPL POS or SUPL POS INIT message, which may be conveyed using TCP and IP protocols.

An LS and a base station (e.g. an eNB for LTE access or gNB for NR access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNB and a LS that is an E-SMLC. In the case of NR access, the NR Positioning Protocol A (NRPPa) defined in 3GPP TS 38.455 may be used to transfer such messages between a base station that is either a gNB providing NR access or an eNB (referred to as a next generation eNB or ng-eNB) providing 5G LTE access and a LS that is an LMF.

Position methods (also referred to as positioning methods or as posmethods) may be classified as downlink (DL), uplink (UL) or uplink-downlink (UL-DL). With a downlink position method, a UE which is being positioned obtains DL location measurements of DL signals transmitted from space vehicles (SVs), base stations (e.g. gNBs and/or ng-eNBs), access points (APs) (e.g. WiFi APs) and/or positioning only beacons. The UE then either determines a location estimate from these measurements in the case of UE based positioning, or sends the measurements to an LS to determine a location in the case of UE assisted positioning. Examples of DL position methods include DL-TDOA, DL-AOD and ECID.

With an uplink position method, a UE which is being positioned transmits UL signals, which may carry control information and/or data, to one or more base stations (e.g. gNBs and/or ng-eNBs), access points (e.g. WiFi APs) and/or reception points in or associated with a serving network for the UE, and which obtain UL location measurements of the transmitted UL signals. Examples of UL signals carrying control information only include UL PRS and UL Sounding Reference Signals (SRS). The one or more base stations, access points and/or reception points then pass the UL location measurements to a positioning entity, such as an LS, which determines a location estimate for the UE from these measurements. Examples of UL position methods include UL-TDOA, UL-AOA, and ECID (in a variant in which network side measurements are used).

With an uplink-downlink (UL-DL) position method, DL location measurements are obtained by the UE as for a DL position method and UL location measurements are obtained by one or more base stations, access points or reception points as for an UL position method. Then, in the case of UE based positioning, the UL measurements are transferred to the UE to obtain a location estimate. Alternatively, in the case of UE assisted positioning, the DL measurements and UL measurements are both transferred to an LS to obtain a location estimate. An example of an UL-DL position method is multi-RTT.

CP location solutions such as the CP location solutions defined by 3GPP can support all three types of position method (UL, DL and UL-DL) because the use of existing signaling interfaces and signaling protocols, that are used to request and obtain location measurements and request and receive other location related information, enable an LS to interact with all potential participating entities. However, UP location solutions such as SUPL are normally restricted to supporting DL position methods only, because an LS such as an SLP can only interact with a UE to request DL location measurements and cannot (according to current UP location solutions such as SUPL) interact with base stations or network entities to request UL location measurements or other location related information. It may thus be desirable for UL and UL-DL position methods to be supportable with SUPL in order to improve location performance and flexibility.

FIG. 1 shows a diagram of a communication system 100, for location support of a user equipment (UE) 105 that supports and is operating using Fifth Generation (5G) features of communication system 100. Here, the communication system 100 comprises a UE 105, and components of a Fifth Generation (5G) network, comprising a Next Generation RAN (NG-RAN) 135 and a 5G Core Network (5GCN) 140. NG-RAN 135 plus 5GCN 140 may comprise a 5G System (5GS) (also referred to as 5G network), which may also be referred to as a New Radio (NR) network; NG-RAN 135 may be referred to as a 5G RAN or as an NR RAN; and SGCN 140 may be referred to as an NG Core network (NGC). The NG-RAN 135 and the SGCN 140 may be part of a Visited Public Land Mobile Network (VPLMN) that is a serving network for the UE 105 or may be part of a Home Public Land Mobile Network (HPLMN) for UE 105. When functioning as a VPLMN, there may be a separate HPLMN for the UE 105 (not shown in FIG. 1) that communicates with the SGCN 140 (e.g. via the Internet). The communication system 100 may further utilize information from space vehicles (SVs) 190 for a Global Navigation Satellite System (GNSS) like the Global Positioning System (GPS), GLONASS, Galileo, Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 150, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G network, similar network implementations and configurations may be used for other communication technologies, such as 3G, Long Term Evolution (LTE), IEEE 802.11 WiFi (also referred to as Wi-Fi) etc.

The UE 105 may comprise any electronic device configured for wireless communications. The UE 105 may be referred to as a device, a wireless device, a mobile terminal, a terminal, a mobile station (MS), a mobile device, a SUPL Enabled Terminal (SET), or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 105 may comprise a single entity or may comprise multiple entities such as in a personal area network where a user may employ audio, video and/or data I/O devices and/or body sensors and a separate wireline or wireless modem. Typically, though not necessarily, a UE 105 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), 5G New Radio (NR), WiMax, etc. SGCN 140 combined with NG-RAN 135 may be an example of a WWAN. A UE 105 may also support wireless communication with one or more types of Wireless Local Area Network (WLAN) such as a WLAN supporting IEEE 802.11 WiFi (also referred to as Wi-Fi) or Bluetooth® (BT). UE 105 may also support communication with one or more types of wireline network such as by using a Digital Subscriber Line (DSL) or packet cable for example. Although FIG. 1 shows only one UE 105, there may be many other UEs (e.g. hundreds, thousands or millions) that can each correspond to UE 105.

An estimate of a location of a UE 105 may be referred to as a location, location estimate, location fix, fix, position, position estimate or position fix, and may be geodetic, thereby providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of a UE 105 may also include an uncertainty and may then be expressed as an area or volume (defined either geodetically or in civic form) within which the UE 105 is expected to be located with some given or default probability or confidence level (e.g., 67% or 95%). A location of a UE 105 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location or some previous location of UE 105. In the description contained herein, the use of the term location may comprise any of these variants unless indicated otherwise. Measurements (e.g. obtained by UE 105 or by another entity such as gNB 110-1) that are used to determine (e.g. calculate) a location estimate for UE 105 may be referred to as measurements, location measurements, location related measurements, positioning measurements or position measurements and the act of determining a location for the UE 105 may be referred to as positioning of the UE 105 or locating the UE 105.

The UE 105 may enter a wireless connected state with communication system 100 that may include the NG-RAN 135 and SGCN 140. In one example, UE 105 may communicate with a cellular communication network by transmitting wireless signals to, and/or receiving wireless signals from, a cellular transceiver, such as NR Node B (gNB 110-1) in the NG-RAN 135. The NG-RAN 135 may include one or more additional gNBs 110-2. The gNB 110-1 provides user plane and control plane protocol terminations toward the UE 105. The gNB 110-1 may comprise a serving gNB for UE 105 and may also be referred to as a base station, a base transceiver station, a radio base station, a radio transceiver, a radio network controller, a transceiver function, a base station subsystem (BSS), an extended service set (ESS), or by some other suitable terminology. The UE 105 also may transmit wireless signals to, or receive wireless signals from, a local transceiver (not shown in FIG. 1), such as an access point (AP), femtocell, Home Base Station, small cell base station, Home Node B (HNB) or Home gNB (HgNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect.

Examples of network technologies that may support wireless communication include GSM, CDMA, WCDMA, HRPD, eMTC and 5G NR. NB-IoT, GSM, WCDMA, LTE, eMTC and NR, which are technologies defined by 3GPP.

CDMA and HRPD are technologies defined by the 3rd Generation Partnership Project 2 (3GPP2). Cellular transceivers, such as gNBs 110-1 and 110-2, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

Base stations (BSs) in the NG-RAN 135 shown in FIG. 1 comprise NR Node Bs, also referred to as gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communication access to the SGCN 140 on behalf of the UE 105 using 5G NR. 5G NR radio access may also be referred to as NR radio access or as 5G radio access. In FIG. 1, the serving gNB for UE 105 is assumed to be gNB 110-1, although other gNBs (e.g. gNB 110-2) may act as a serving gNB if UE 105 moves to another location or may act as a secondary gNB to provide additional throughout and bandwidth to UE 105.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114.

As noted, while FIG. 1 depicts nodes configured to communicate according to 5G communication protocols, nodes configured to communicate according to other communication protocols, such as, for example, the LTE protocol for an Evolved Universal Mobile Telecommunications System (UMTS) Terrestrial Radio Access Network (E-UTRAN) or IEEE 801.11 WiFi, may be used. For example, in a 4G Evolved Packet System (EPS) providing LTE wireless access to UE 105, a RAN may comprise an E-UTRAN, which may comprise base stations comprising evolved NodeBs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. Nodes configured to communicate using different protocols, may be controlled, at least in part, by the SGCN 140. Thus, the NG-RAN 135 may include any combination of gNBs 110, ng-eNBs 114, or other types of base stations or access points.

The gNBs 110 and ng-eNB 114 can communicate with an Access and Mobility Management Function (AMF) 154, which, for positioning functionality, communicates with a Location Management Function (LMF) 152. The AMF 154 may support access and registration by the UE 105, mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 135; termination of Non-Access Stratum (NAS) signaling connections from UEs such as UE 105; NAS ciphering and integrity protection; registration management; connection management; reachability management; mobility management; transport of Short Message Service (SMS) messages between UE 105 and an SMS Function (SMSF) (not shown in FIG. 1); access authentication and authorization.

The LMF 152 may support positioning of the UE 105 when UE 105 accesses the NG-RAN 135 and may support position procedures/methods such as Assisted GNSS (A-GNSS), Downlink Time Difference of Arrival (DL-TDOA), UL-TDOA, Real Time Kinematic (RTK), Precise Point Positioning (PPP), Differential GNSS (DGNSS), Enhanced Cell ID (ECID), UL-AOA, DL-AOD, round trip signal propagation time (RTT), multi-cell RTT (multi-RTT), WLAN positioning and/or other position methods. The LMF 152 may be connected to AMF 154 and/or to GMLC 155. The LMF 152 may also process location services requests for the UE 105, e.g., received from the AMF 154 or from the GMLC 155. In some embodiments, a node/system that can implement the LMF 152 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of the location of UE 105) may be performed at the UE 105 (e.g., using signal measurements obtained by UE 105 for signals transmitted by wireless nodes such as gNBs 110, and assistance data provided to the UE 105, e.g. by LMF 152 or gNB 110-1).

The Gateway Mobile Location Center (GMLC) 155 may support a location request for the UE 105 received from an external client 150 or from a Home GMLC (HGMLC) in a separate HPLMN, not shown, and may forward such a location request to the AMF 154 for forwarding by the AMF 154 to the LMF 152 or may forward the location request directly to the LMF 152. A location response from the LMF 152 (e.g. containing a location estimate for the UE 105) may be similarly returned to GMLC 155 either directly or via the AMF 154 and the GMLC 155 may then return the location response (e.g., containing the location estimate) to the external client 150 or to a HGMLC. The GMLC 155 is shown connected to both the AMF 154 and LMF 152, but only one of these connections may be supported by SGCN 140 in some implementations.

A Location Retrieval Function (LRF) 153 may be connected to, or may be part of, the GMLC 155, as defined in 3GPP Technical Specifications (TS) 23.271 and 23.273. LRF 153 may perform the same or similar functions to GMLC 155, with respect to receiving and responding to a location request from an external client 150 that corresponds to a Public Safety Answering Point (PSAP) supporting an emergency call from UE 105.

The LMF 152 may communicate with the gNBs 110 and/or with the ng-eNB 114 using a New Radio Position Protocol A (NRPPa), defined in 3GPP Technical Specification (TS) 38.455, with NRPPa messages being transferred between a gNB 110 and the LMF 152, and/or between an ng-eNB 114 and the LMF 152 via the AMF 154. The LMF 152 and UE 105 may also communicate using the LTE Positioning Protocol (LPP) defined in 3GPP TS 36.355 and TS 37.355. Here, LPP and/or LPP/LPPe messages may be transferred between the UE 105 and the LMF 152 via the AMF 154 and a serving gNB 110-1 or serving ng-eNB 114 for UE 105. For example, LPP and/or LPP/LPPe messages may be transferred between the LMF 152 and the AMF 154 using a service based protocol based on the HyperText Transfer Protocol (HTTP), and may be transferred between the AMF 154 and the UE 105 using a 5G Non-Access Stratum (NAS) protocol. The LPP and/or LPP/LPPe protocol may be used by LMF 152 to support positioning of UE 105 using UE assisted and/or UE based DL and/or UL-DL position methods such as A-GNSS, RTK, DL-TDOA, DL-AOD, multi-RTT, ECID and/or WLAN positioning. The NRPPa protocol may be used by LMF 152 to support positioning of UE 105 using UL and UL-DL position methods such as UL-TDOA, UL-AOA, multi-RTT and/or ECID, and/or may be used by LMF 152 to obtain location related information from gNBs 110 and/or ng-eNB 114, such as parameters defining PRS transmissions from gNBs 110 and/or ng-eNB 114. For example, location related information provided by the gNBs 110 and/or ng-eNB 114 to the LMF 152 using NRPPa may include timing and configuration information for PRS transmission from gNBs 110 and/or ng-eNB 114 and/or location coordinates of the gNBs 110 and/or ng-eNB 114. The LMF 152 can then provide some or all of this location related information to the UE 105 as assistance data in an LPP message via the NG-RAN 135 and the SGCN 140 in order to support DL and/or UL-DL position methods by UE 105.

With a UE assisted DL or UL-DL position method, UE 105 may obtain DL location measurements and send the measurements to a location server (e.g. LMF 152) for computation of a location estimate for UE 105. For example, the DL location measurements may include one or more of a Received Signal Strength Indication (RSSI), RTT, UE Receive Time-Transmission Time Difference (Rx-Tx), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The DL location measurements may also or instead include measurements of GNSS pseudorange, code phase and/or carrier phase for SVs 190. With a UE based DL or UL-DL position method, UE 105 may obtain DL location measurements (e.g. which may be the same as or similar to location measurements for a UE assisted DL or UL-DL position method) and may compute a location of UE 105 (e.g. with the help of assistance data received from a location server such as LMF 152 or broadcast by gNBs 110, ng-eNB 114 or other base stations or APs). With an UL or UL-DL position method, one or more base stations (e.g. gNBs 110 and/or ng-eNB 114) or APs may obtain location measurements (e.g. measurements of gNB Rx-Tx, RSSI, RTT, RSRP, RSRQ, AOA or Time Of Arrival (TOA)) for signals transmitted by UE 105, and/or may receive measurements obtained by UE 105, and may send the measurements to either a location server (e.g. LMF 152) or the UE 105 for computation of a location estimate for UE 105.

Information provided by the gNBs 110 and/or ng-eNB 114 to the location server, e.g., LMF 152, using NRPPa, may include timing and configuration information for PRS transmission and location coordinates. The location server may then provide some or all of this information to the UE 105 as assistance data in an LPP and/or LPP/LPPe message via the NG-RAN 135 and the SGCN 140.

An LPP or LPP/LPPe message sent from the LMF 152 to the UE 105 may instruct the UE 105 to do any of a variety of things, depending on desired functionality. For example, the LPP or LPP/LPPe message could contain an instruction for the UE 105 to obtain measurements for GNSS (or A-GNSS), WLAN, DL-TDOA, multi-RTT, DL-AOD, or some other position method. In the case of DL-TDOA, the LPP or LPP/LPPe message may instruct the UE 105 to obtain one or more measurements (e.g. RSTD measurements) of PRS signals transmitted within particular cells supported by particular gNBs 110 (or supported by one or more ng-eNBs or eNBs). The UE 105 may send the measurements back to the LMF 152 in an LPP or LPP/LPPe message (e.g. inside a 5G NAS message) via the serving gNB 110-1 (or serving ng-eNB 114) and the AMF 154.

As illustrated, SGCN 140 includes a Unified Data Management (UDM) 142 that may be connected to the GMLC 155 (e.g., via the Internet), as well as a User Plane Function (UPF) 157. The UDM 142 is analogous to a Home Subscriber Server (HSS) for LTE access, and if desired, the UDM 142 may be combined with an HSS. The UDM 142 is a central database that contains user-related and subscription related information for UE 105 and may perform the following functions: UE authentication, UE identification, access authorization, registration and mobility management, subscription management and SMS management. The UPF 157 may support voice and data bearers for UE 105 and may enable UE 105 voice and data access to other networks such as the Internet. UPF functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

The UPF 157 may be connected to a location server (LS), such as the SLP 130. The SLP 130 may support the SUPL user plane (UP) location solution defined by the Open Mobile Alliance (OMA) and may support location services for UE 105 based on subscription information for UE 105 stored in SLP 130. The SLP 130 may function as a home SLP (SLP) for UE 105, a Discovered SLP (D-SLP) and/or as an Emergency SLP (E-SLP). SLP 130 and LMF 152 in communication system 100 are both examples of a LS that may employ the LPP and/or LPP/LPPe protocols for positioning of UE 105.

To support a SUPL location session between UE 105 and SLP 130 in communication system 100, the UE 105 and SLP 130 may exchange SUPL messages at a user plane level using IP and TCP (or possibly UDP for an initial SUPL INIT message) as transport protocols. FIG. 1 shows a typical path 170 for a SUPL message, which comprises routing the SUPL message through gNB 110-1 and UPF 157, in this order for a SUPL message sent from UE 105 to SLP 130, or in the reverse order for a SUPL message sent from SLP 130 to UE 105. For example, in the signaling flows described later for FIGS. 5-7, each of the SUPL messages shown as being transferred between the UE 105 and SLP 130 may be transferred via routing along the path 170, when the signaling flows are supported by communication system 100.

With a normal SUPL location solution, SLP 130 may not be connected to AMF 154. However, with an "extended SUPL solution" as described here, SLP 130 may be connected to AMF 154. For example, SLP 130 may be connected to AMF 154 using the same or a similar service based protocol as used to connect AMF 154 to LMF 152, which may facilitate transfer of NRPPa messages between SLP 130 and gNBs 110 and/or ng-eNB 114 via AMF 154. Alternatively, SLP 130 may be connected to LMF 152 or physically combined with LMF 152 in order to transfer NRPPa messages between SLP 130 and gNBs 110 and/or ng-eNB 114 via AMF 154, and via LMF 152 when LMF 152 is connected to but not combined with LMF 152. An SLP 130 which supports the extended SUPL solution described herein is referred to here as an "extended SLP".

The GMLC 155 may be connected to UDM 142 for UE 105. One or more of GMLC 155, UPF 157, LRF 153 and SLP 130 may be connected to external client 150, e.g., through another network, such as the Internet. In some cases, a Requesting GMLC (RGMLC) located in another PLMN (not shown in FIG. 1) may be connected to GMLC 155 (e.g., via the Internet) in order to provide location access to UE 105 on behalf of external clients connected to the RGMLC. The RGMLC and GMLC 155 may support location access to UE 105 using the 3GPP CP solution defined in 3GPP TS 23.271 and in 3GPP TS 23.273.

It should be understood that while a single network (comprising NG-RAN 135 and SGCN 140) is illustrated in FIG. 1, a separate HPLMN may be present, which may include a separate GMLC, a separate LRF a separate UPF, and may include the SLP 130 (e.g. connected to the separate UPF).

It should be noted that the gNBs 110 and ng-eNB 114 may not always both be present in the NG-RAN 135. Moreover, when both the gNBs 110 and ng-eNB 114 are present, the NG interface with the AMF 154 may only be present for one of them.

As illustrated in FIG. 1, a gNB 110 may include one or more Transmission Reception Points (TRPs) 112, which may each include one or more Transmission Points (TPs), such as broadcast-only TPs for improved support of DL and UL-DL position methods such as DL-TDOA, multi-RTT, DL-AOD or ECID, and/or one or more Reception Points (RPs), such as internal Location Measurement Units (LMUs) for UL measurements for UL and DL-UL position methods such as UL-TDOA, UL-AOA, multi-RTT or ECID.

As illustrated, the ng-eNB 114 may control one or more TPs 111, which may use different protocols than the TPs in gNBs 110-1 and 110-2, e.g., the TPs 111 may use protocols related to LTE, while TPs in gNBs 110-1 and 110-2 use protocols related to 5G NR. The TPs 111 may perform similar functions as TPs in gNBs 110-1 and 110-2.

Figure 2:
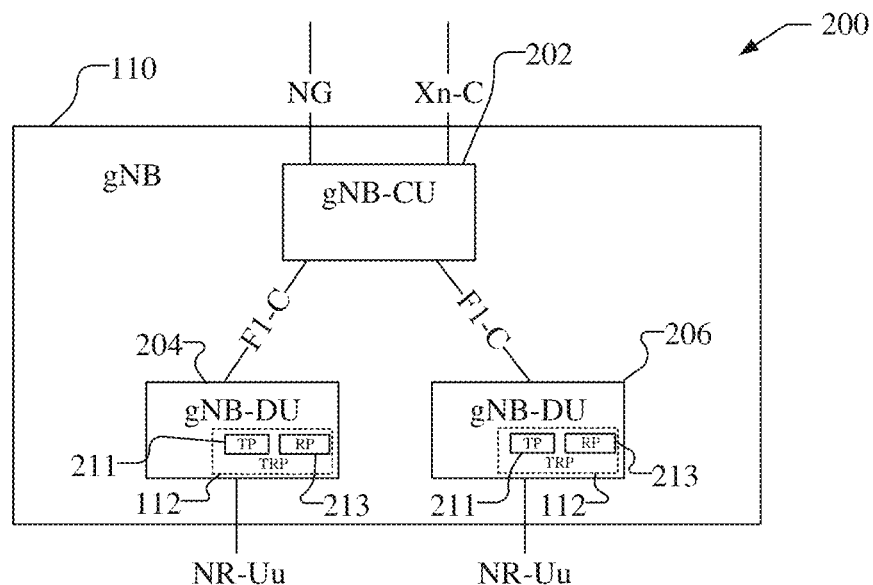
FIG. 2 shows an architecture diagram of an NG-RAN node.

FIG. 2 shows an architecture diagram of an NG-RAN node 200, which may be a gNB 110, according to one implementation. The architecture shown in FIG. 2, for example, may be applicable to any gNB 110-1 and 110-2 in NG-RAN 135 shown in FIG. 1.

As illustrated in FIG. 2, gNB 110 includes a gNB Central Unit (gNB-CU) 202, and gNB Distributed Units (gNB-DUs) 204 and 206, which may be physically co-located in the gNB 110 or may be physically separate. The gNB-CU 202 is a logical or physical node hosting support for Radio Resource Control (RRC), Service Data Adaptation Protocol (SDAP), and Packet Data Convergence Protocol (PDCP) protocols of the gNB 110 used over the NR Uu air interface and controlling the operation of one or more gNB-DUs. The gNB-CU 202 terminates an F1-C interface connected with each gNB-DU 204 and 206. As illustrated, the gNB-CU 202 may communicate with an AMF 154 via a Next Generation (NG) interface. The gNB-CU 202 may further communicate with one or more other gNBs 110 via an Xn interface. The gNB-DUs 204 and 206 are logical or physical nodes hosting support for Radio Link Control (RLC), Medium Access Control (MAC), and Physical (PHY) protocol layers used over the NR Uu air interface of the gNB 110, operation of which is partly controlled by gNB-CU 202. The gNB-DUs 204 and 206 each terminate the F1-C interface connected with the gNB-CU 202. The gNB-CU 202 may request positioning measurements (e.g. Rx-Tx, AOA, RSRP) from the gNB-DU 204 and 206. The gNB-DU 204 and 206 reports the measurements back to the gNB-CU 202. A gNB-DU 204 or 206 may include positioning measurement functionality.

Additionally, as illustrated in FIG. 2, a gNB-DU 204 or 206 may include a TRP 112 which may include one or more TPs 211 and/or one or more RPs 213, which may be physically or logically located in the gNB-DU 204 or 206. The gNB-CU 202 may be configured to communicate with each TP 211 and RP 213, e.g., via F1-C interfaces. The gNB-CU 202 may thus control one or more TPs 211 and/or one or more RPs 213 via an F1-C interface.

In some embodiments, the NG-RAN node 200 (or gNB 110) may comprise a subset of the elements shown in FIG. 2. For example, the NG RAN node 200 may comprise the gNB-CU 202 but may not include one or more of gNB-DUs 204 and 206, RPs 213 or TPs 211. Further, the elements shown in FIG. 2 may be logically separate but physically co-located or may be partially or completely physically separate. For example, one or more of gNB-DUs 204 and 206, RP 213 or TPs 211 may be physically separate from gNB-CU 202 or may be physically combined with gNB-CU 202. In the case of physical separation, the F1-C interface may define signaling over a physical link or connection between two separated elements. In some implementations, gNB-CU 202 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DUs 204 and 206 to support NR Uu air interface signaling for control plane and user plane, respectively. However, only the gNB-CU-CP may interact with TPs 211 and RPs 213 to support and control location related communication.

Protocol layering between the gNB-CU 202 and a TP 211 and RP 213 may be based on F1-C as defined in 3GPP TS 38.470, which uses an F1 Application Protocol (F1AP) protocol at the top level as specified in 3GPP TS 38.473. New messages to support positioning could be added directly into F1AP or could be introduced in a new location specific protocol which is transported using F1AP.

The location procedures between the gNB-CU 202 and LMF 152 or an extended SLP 130 may comprise all location related procedures on NG, Xn, and NR-Uu interfaces. For example, the location procedures between AMF 154 and the NG-RAN node 200 may use an NG Application Protocol (NGAP). The location procedures between NG-RAN node 200 and other NG-RAN nodes, e.g., gNBs 110, may use an Xn Application Protocol (XnAP) or a protocol above XnAP, such as NRPPa. The location procedures between NG-RAN node 200 and UE 105 may use the Radio Resource Protocol (RRC) defined in 3GPP TS 38.331 and/or LPP.

The corresponding messages to support positioning may be carried inside transparent message transfer containers. For example, the transfer of a service based location request message and a corresponding service based location response message between AMF 154 and a gNB 110 may be carried in an UL/DL NGAP Message Transfer container. The transfer of LPP, NRPPa and service based location request and response messages may be carried between a pair of gNBs 110 in an UL/DL XnAP Message Transfer container. The transfer of location related RRC or LPP messages between a gNB 110 and UE 105 may be carried in an UL/DL RRC Message Transfer container. The above support may also be realized between a gNB-CU 202 and gNB-DU 204 or 206 using an F1AP Message Transfer container.

In one example for the UL-DL position method multi-RTT, a UE 105 may measure UE Rx-Tx and RSRP for downlink PRS signals received from multiple TRPs 112, e.g., gNBs 110, at the UE 105, and gNBs 110 may measure gNB Rx-Tx and RSRP at multiple TRPs 112 for uplink signals (e.g. UL SRS) transmitted from UE 105. The UE 105, for example, measures the UE Rx-Tx measurements (and optionally RSRP of the received signals) using assistance data received from the location server, e.g., LMF 152 or extended SLP 130, and the TRPs 112 measure the gNB Rx-Tx measurements (and optionally UL RSRP of the received signals) using assistance data received from the location server (e.g., LMF 152 or extended SLP 130). The measurements may be used to determine an RTT between UE 105 and each of one or more gNBs 110 at the location server (or UE 105) which may be used to estimate the location of the UE.

Figure 3A:
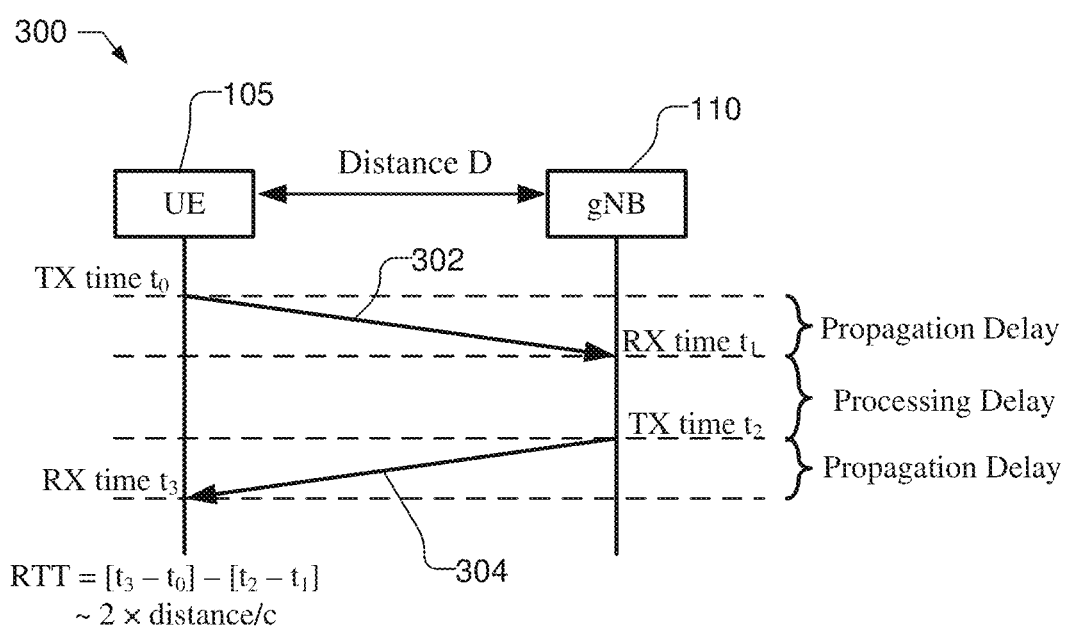
FIG. 3A is a diagram showing exemplary timings within an RTT measurement during a wireless probe request and a response.

FIG. 3A is a diagram 300 showing exemplary timings within an RTT measurement during a wireless probe request and a response. In FIG. 3A, a straight line distance D between UE 105 and gNB 110 is represented horizontally, while time is represented vertically with time increasing from top to bottom.

As illustrated, the UE 105 transmits an RTT related measurement signal (or message) 302 at time $t_0$, which is received by the gNB 110 at time $t_1$. The time that it takes for the RTT related measurement signal 302 from the UE 105 to reach the gNB 110 is the propagation delay that is due to the distance D between the UE 105 and gNB 110. After some time (processing delay), the gNB 110 transmits an RTT related response signal (or message) 304 at time $t_2$, which is received by the UE 105 at time $t_3$. The time that it takes for the RTT related response signal 304 from the gNB 110 to reach the UE 105 is another propagation delay that is due to the distance D between the gNB 110 and the UE 105. Ignoring factors, such as timing advance (TA), which compensates for misalignment between transmission and reception timing, the RTT may be calculated as RTT=$[t_3-t_0]-[t_2-t_1]$, which is equal to approximately twice the distance D divided by the propagation velocity (speed of light). Thus, the distance D between the UE 105 and a single gNB 110 may be determined.

The RTT procedure, as described above, may be used between the UE 105 and multiple gNBs 110, e.g., a serving gNB 110-1 for the UE 105 and one or more neighboring gNBs 110-2, for multi-RTT determination. To improve efficiency of signaling for multiple gNBs 110 and reduce the number of separate measurements, for example, the RTT related measurement signal 302 from the UE 105 may be sent once only (or a few times) and measured by all the participating gNBs 110. The serving gNB 110-1 may send reception time values for all gNBs 110 (and optionally the transmission times for all gNBs 110) to the UE 105 in a single message, e.g., after transmission of the RTT related response signals 304. To optimize transfer of the values of both reception and transmission times in a separate message, only the values for the difference between these times, e.g., $t_2-t_1$, needs to be sent.

In a UE assisted positioning procedure, the UE 105 may provide the DL multi-RTT measurements to a location server, e.g., LMF 152 or extended SLP 130, and the location server may determine a position estimate of the UE 105 based on the UL and DL multi-RTT measurements. In a UE based positioning procedure, a location server, e.g., LMF 152 or extended SLP 130, or one or more gNBs 110 may provide the multi-RTT UL measurements to the UE 105, which may use the UL and DL multi-RTT measurements along with information related to the geographic locations of the gNBs 110 to determine the position estimate of the UE 105. The UE 105 may then provide the determined position estimate, along with the multi-RTT measurements, if desired, to the location server.

Figure 3B:
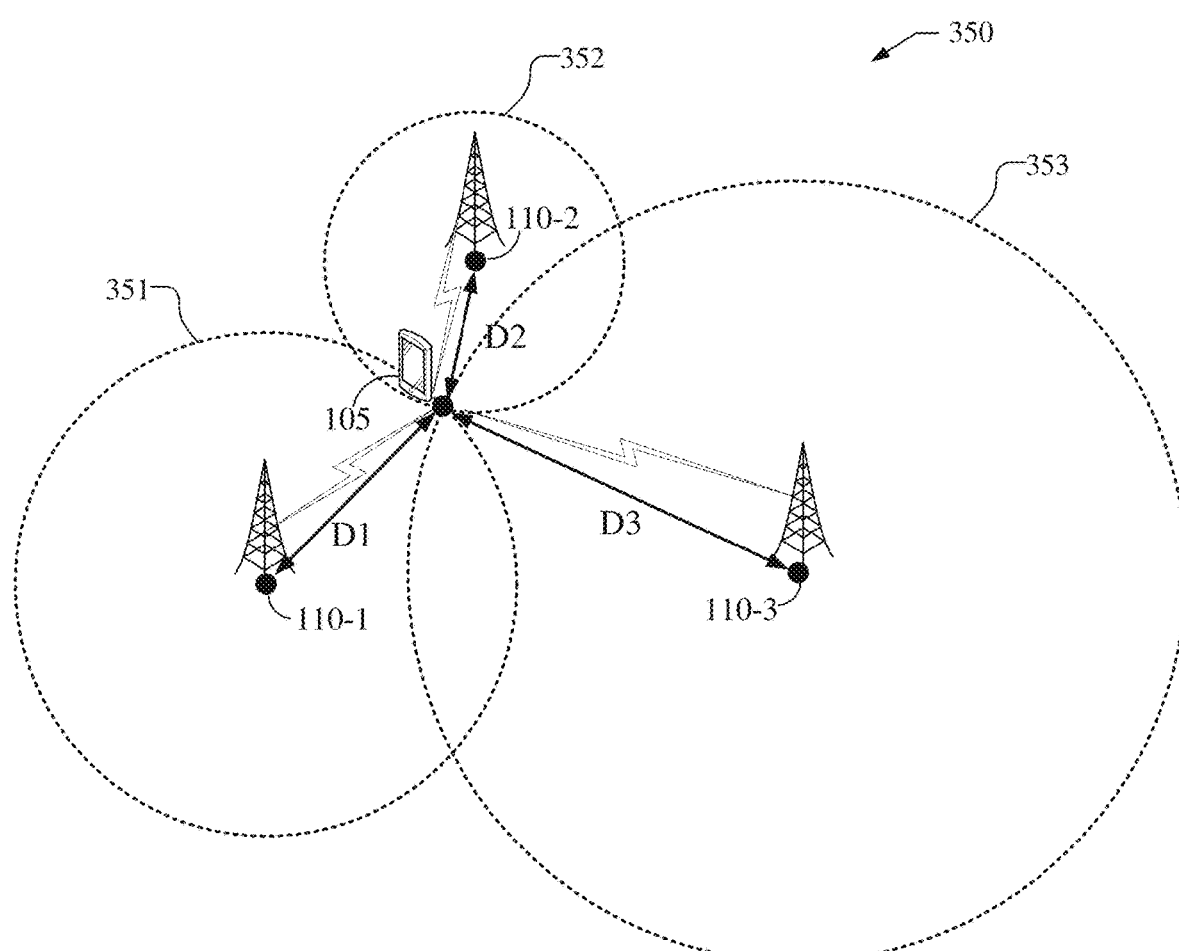
FIG. 3B illustrates a simplified environment and an exemplary technique for determining a position of a UE using distances determined using multi-RTT measurements.

FIG. 3B, for example, illustrates a simplified environment 350 and an exemplary technique for determining a position of a UE 105 using distances from a plurality of gNBs 110-1, 110-2, 110-3 (sometimes collectively referred to as gNBs 110) determined using multi-RTT measurements. While three gNBs 110 are shown in FIG. 2, aspects may utilize additional gNBs.

In order to determine the position of the UE 105, the network geometry must be known. The network geometry, for example, may include the geographic location of each of the gNBs 110 in a reference coordinate system. For a UE based positioning procedure, the network geometry may be provided to the UE 105 in any manner, such as, for example, providing the information in beacon signals, providing the information using a server, e.g., in positioning assistance data, providing the information using uniform resource identifiers, etc.

As illustrated, the distances D1, D2, and D3 between UE 105 and respective gNBs 110-1, 110-2, 110-3 is determined, using multi-RTT, as discussed above. With the distance to each gNB 110 known and the position of each gNB known, the position of the UE 105 may be solved using a variety of known geometric techniques, such as, for example, trilateration. From FIG. 3B, it can be seen that circles 351, 352, and 353 centered on respective gNBs 110-1, 110-2, 110-3 have radii equal to the distances D1, D2, and D3. The position of the UE 105 ideally lies at the common intersection of all of the circles 351, 352, and 353.

An example of an uplink position method is UL-AOA, which makes use of the measured azimuth angle of arrival (A-AOA) and possibly the zenith angle of arrival (Z-AOA) at multiple RPs 213 of uplink signals transmitted from UE 105. For example, the UE 105 may transmit UL PRS or an UL SRS for positioning, which is received by one or more RPs 213. The RPs 213 measure A-AOA and Z-AOA of the received signals using assistance data received from the positioning server (e.g. LMF 152 or extended SLP 130) or from a serving gNB 110-1 for UE 105, and the resulting measurements are used along with other configuration information to estimate the location of the UE 105. Another example of UL position method may be UL-TDOA.

Figure 4A:
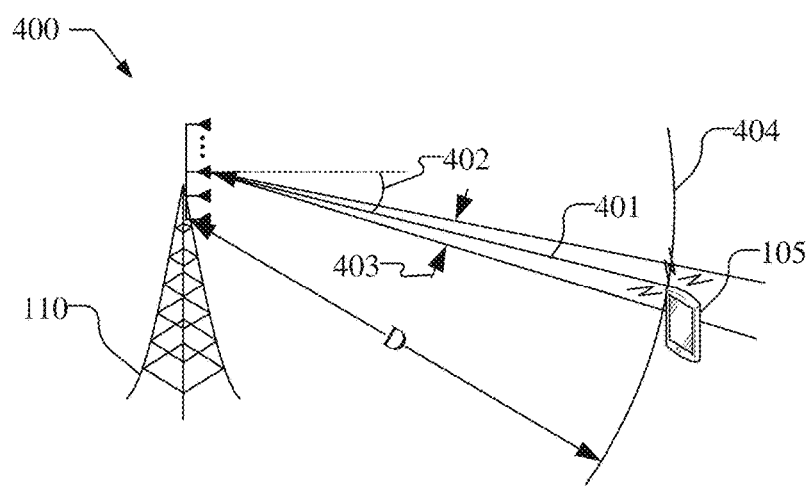
FIG. 4A illustrates a simplified environment for performing UL-AOA position determination with a single base station.

FIG. 4A illustrates a simplified environment 400 for performing UL-AOA position determination with a single gNB 110. An AOA measurement is obtained by gNB 110 using a directional antenna such as a phased array to determine the direction from which a signal from the UE 105 was transmitted. FIG. 4A illustrates an AOA measurement 402 of a UL signal 401 transmitted by the UE 105 as including an uncertainty 403. A single gNB 110 (or an LMF 152) may determine the position of the UE 105 using an AOA measurement when combined with a range estimate 404, e.g., determined using RTT.

Figure 4B:
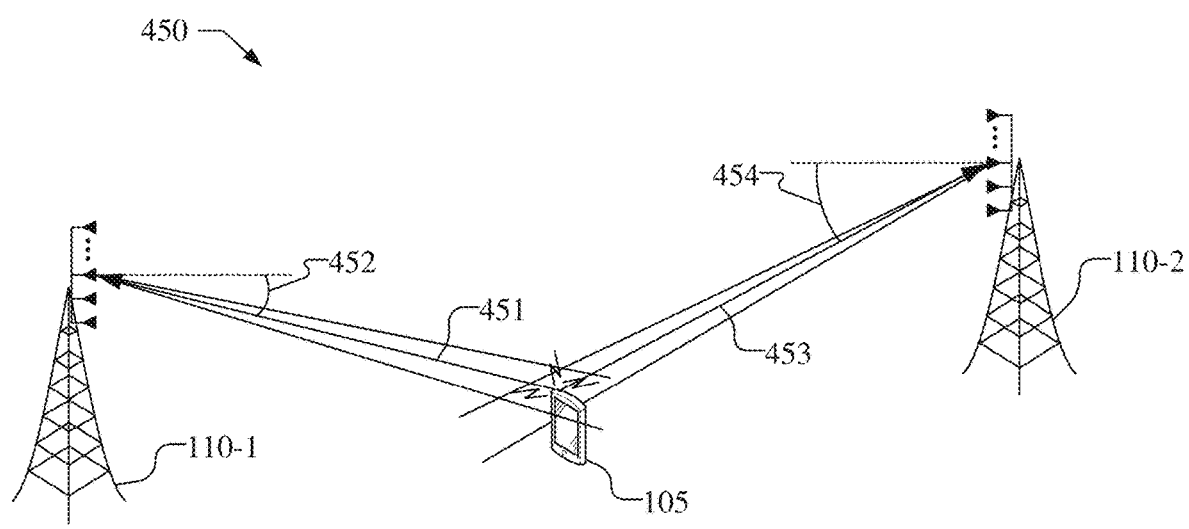
FIG. 4B illustrates a simplified environment for performing UL-AOA position determination with multiple base stations.

FIG. 4B illustrates another simplified environment 450 for performing UL-AOA position determination with multiple gNBs, e.g., gNBs 110-1 and 110-2. FIG. 4A illustrates UE 105 transmitting UL signals 451, 453 and two AOA measurements 452 and 454 (each of which may include an uncertainty) by gNBs 110-1 and 110-2, respectively, of the UL signals 451 and 453. The UL signals 451 and 453 may be the same transmission or separate beamformed transmissions. As illustrated, the AOA measurements 452 and 454 determined by respective gNBs 110-1 and 110-2 intersect at the position of the UE 105.

As discussed above, uplink and uplink-downlink position methods are supported by a CP location solution (e.g. using an LMF 152), but without modification to the SUPL procedures, may not be supportable using SUPL. For example, to support uplink and/or uplink-downlink position methods, NRPPa may be expanded for use by an extended SLP 130. Expanding NRPPa for use by an extended SLP 130 with a UP location solution like SUPL may not impact non-UE associated NRPPa procedures, but may impact UE associated NRPPa procedures in order to solve two problems referred to here as (a) and (b). Problem (a) arises because, with UP location, there would not (normally) be a Correlation identifier (ID) (also referred to as a Location Services (LCS) Correlation ID) assigned at a serving AMF 154 for a UE 105 that is being positioned. With CP location, the AMF 154 can include a Correlation ID in a location request for the UE 105 that is sent by the AMF 154 to an LMF 152 to instigate location of the UE 105 by the LMF 152. The LMF 152 can subsequently send a UE associated NRPPa message to the AMF 154 for forwarding by the AMF 154 to a serving gNB 110 for the UE 105 as part of positioning of the UE 105 (e.g. where the UE associated NRPPa message is sent to the serving gNB 110 in order to instigate UL SRS transmission from the UE 105 to support UL or UL-DL positioning of the UE 105). The LMF can include the Correlation ID along with the UE associated NRPPa message when sending this message to the AMF 154 to enable the AMF 154 to identify the location session and the UE 105 and thereby enable the AMF 154 to correctly forward the UE associated NRPPa message to the serving gNB 110 for the UE 105. However with UP positioning (e.g. using SUPL), the AMF 154 would not have assigned a Correlation ID and thus an SLP 130 may be unable to send a UE associated NRPPa message to a serving gNB 110 for the UE 105, which may prevent the use of an UL or UL-DL position method by the SLP 130. The problem (b) is that a normal (non-extended) SLP 130 may not know the serving AMF 154 for the UE 105 (e.g. may not know a serving AMF 154 identity or identifier (ID)), which may also prevent sending of a UE associated NRPPa message by the SLP 130 to the serving gNB 110 for a UE 105, as the SLP 130 would not know to which AMF to send the UE associated NRPPa message.

Implementations described herein may resolve both problems (a) and (b) and may be used to support a SUPL positioning session for uplink and uplink-downlink position methods. To overcome problem (b) above, the UE 105 may provide a registered AMF 154 identifier (ID) to an extended SLP 130 using SUPL, e.g., in a SUPL POS INIT message. For example, the registered AMF ID may comprise an AMF Region ID, an AMF Set ID and an AMF Pointer. To overcome problem (a) above, the UE 105 may provide to the extended SLP 130 either a UE 105 Subscription Permanent Identifier (SUPI), which may be equivalent to an International Mobile Subscriber Identity (IMSI), or a UE 105 Permanent Equipment Identity (PEI), which may be equivalent to an International Mobile Equipment Identity (IMEI), via inclusion in a SUPL SET Session ID (SetSessionId) parameter (e.g. which may be included in any SUPL message sent to SLP 130 by UE 130 such as a SUPL POS INIT). Alternatively, the UE 105 may provide a 5G-Temporary Mobile Subscriber Identity (5G-TMSI) to an extended SLP 130 to identify the UE 105. The extended SLP 130 may then use UE associated signaling through the serving AMF 154 to transfer a UE associated NRPPa message to the serving gNB 110 using an Namf_Communication_N1N2MessageTransfer service operation to transfer the UE associated NRPPa message to the serving AMF 154 (for forwarding to the serving gNB 110) in which a SUPI or PEI rather than a Correlation ID is used to identify the UE 105 to the serving AMF 154. The extended SLP 130 may further assign and include a correlation ID in this service operation.

In one variant, a UE 105 may send a 5G Globally Unique Temporary UE Identity (5G-GUTI) to an extended SLP 130 (e.g. in a SUPL POS INIT), where the 5G-GUTI includes a Globally Unique AMF Identifier (GUAMI) and a 5G-TMSI, and where the GUAMI includes a PLMN identifier and a local AMF ID. The 5G-TMSI can identify the UE 105 to overcome problem (b) and the GUAMI can identify the AMF 154 to overcome problem (a).

Figure 5:
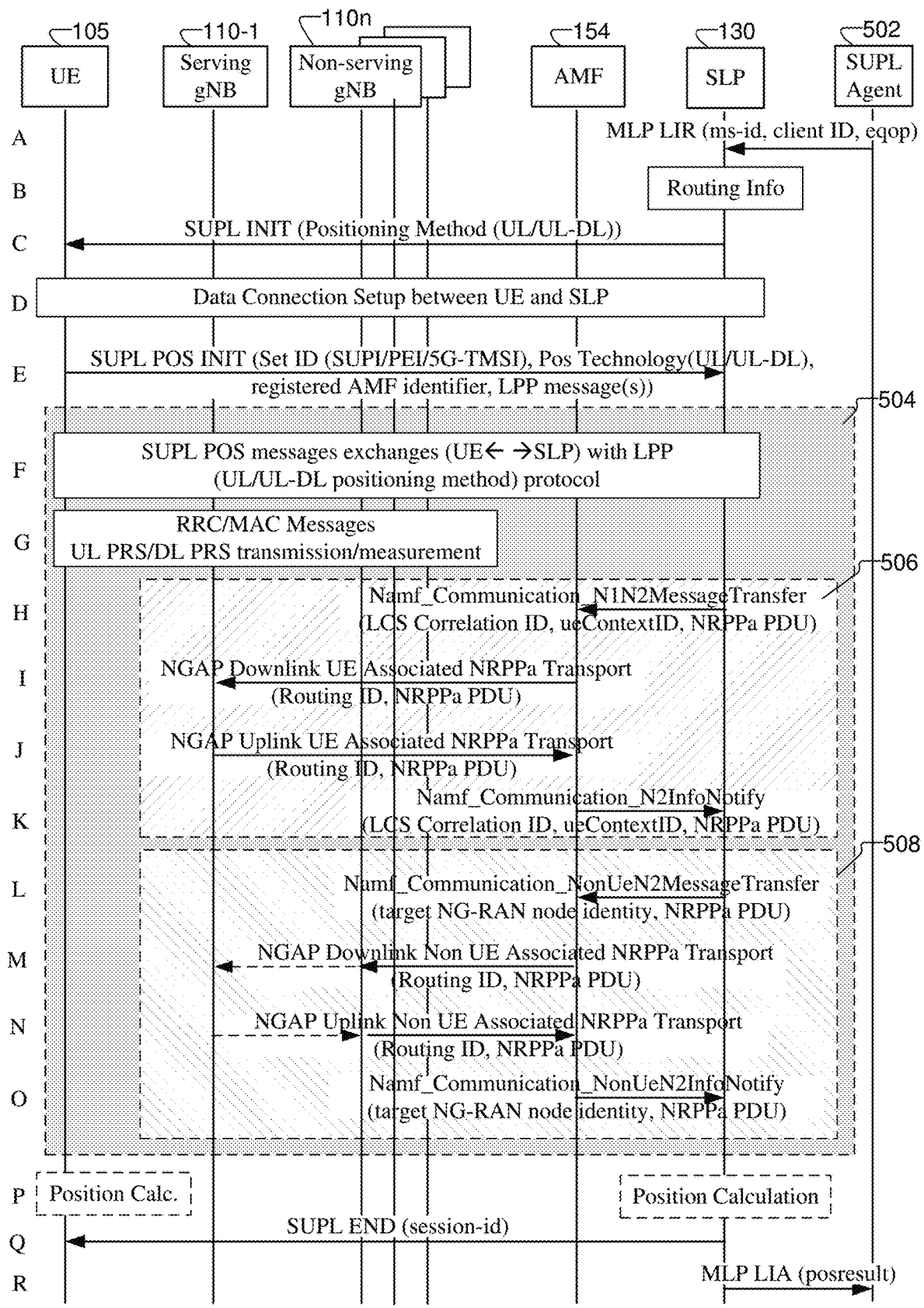
FIG. 5 shows a signaling flow illustrating a network initiated SUPL session supporting at least one uplink or uplink-downlink position method.
Figure 6:
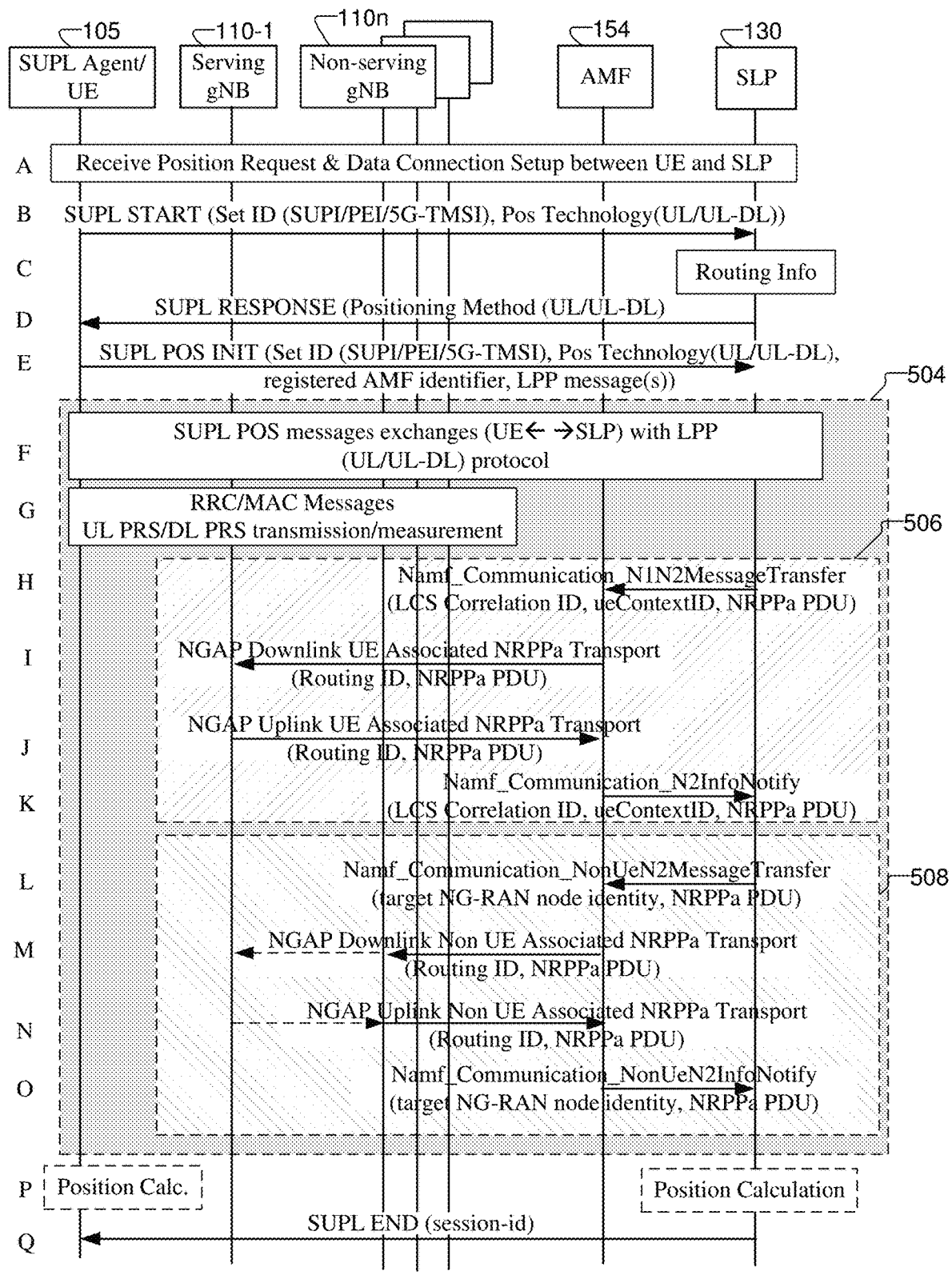
FIG. 6 shows a signaling flow illustrating a UE initiated SUPL session supporting at least one uplink or uplink-downlink position method.
Figure 7:
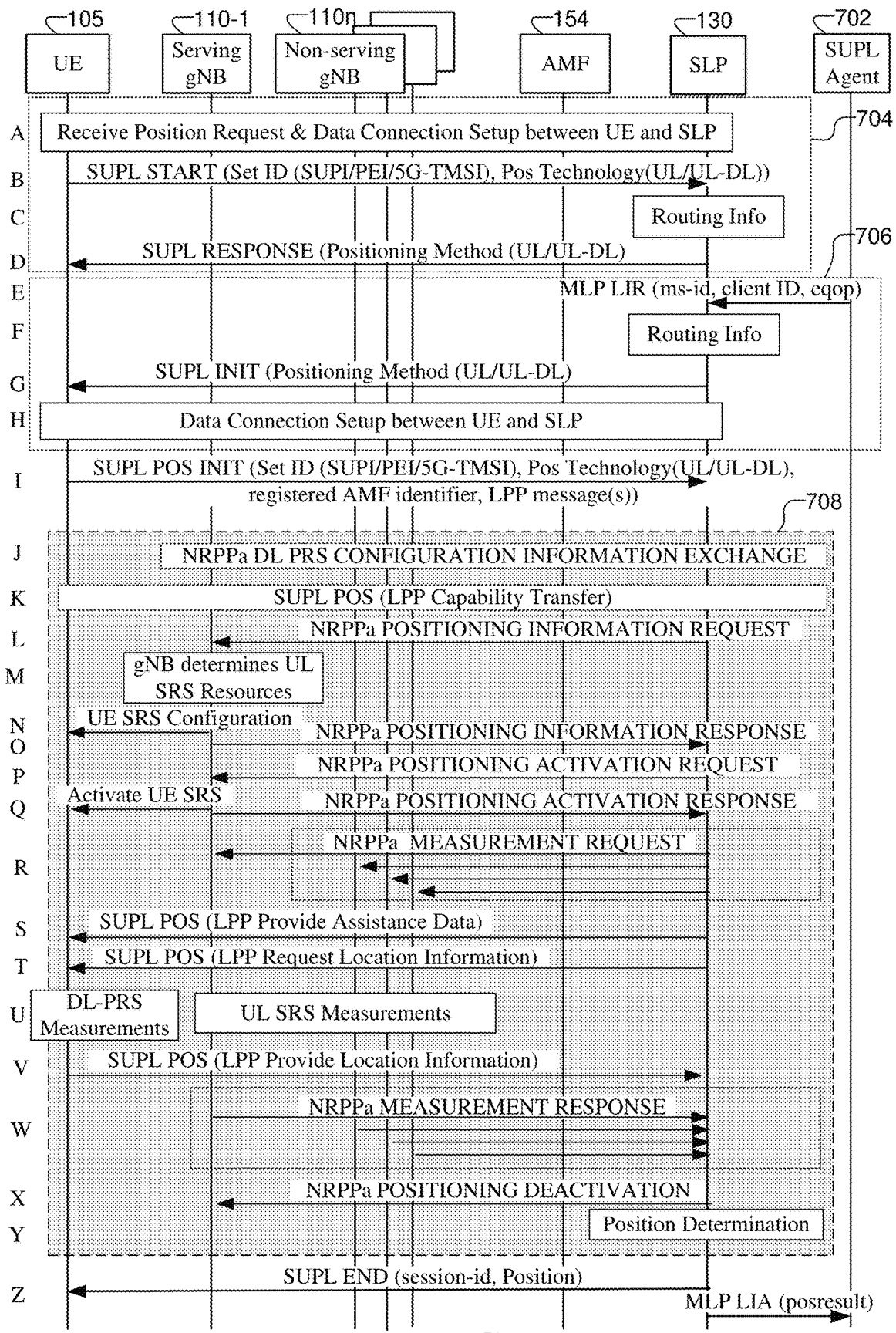
FIG. 7 shows a signaling flow illustrating a network initiated or UE initiated SUPL session supporting multi-RTT positioning.

The exchange of positioning messages between the extended SLP 130 and the UE 105 for uplink and/or uplink-downlink position methods (such as UL-AOA, UL-TDOA, or multi-RTT) may be supported by SUPL and LPP, e.g., to trigger the UE 105 to send the registered AMF ID and SUPI or PEI to the SLP 130 in a SUPL POS INIT message. FIGS. 5-7 described below and process flows 800 and 900 provide illustrations of support for uplink and/or uplink-downlink position methods using an extension of the SUPL location solution and an associated extended SLP 130. For brevity, an extended SLP is simply referred to as an SLP for these figures.

FIG. 5 shows a signaling flow illustrating a network initiated SUPL session supporting at least one uplink or uplink-downlink position method. The signaling flow in FIG. 5 may be applicable to the UE 105 and SLP 130 in communication system 100 and may include a serving gNB 110-1 and one or more non-serving gNBs 110*n*. The serving gNB 110-1 and the non-serving gNBs 110*n* are sometimes collectively referred to as gNBs 110. The signaling flow may be applicable to a commercial location for an external client 150 or location for an emergency call. Accordingly, the SLP 130 may be an H-SLP, D-SLP or an E-SLP. The SUPL agent 502 may correspond to the external client 150 illustrated in FIG. 1, or for an emergency call, the SUPL agent 502 may correspond to a Public Safety Answering Point (PSAP) or a Location Retrieval Function (LRF) 153.

At stage A in FIG. 5, SUPL Agent 502 sends an OMA Mobile Location Protocol (MLP) Location Immediate Request (LIR) message to the SLP 130, with which SUPL Agent is associated. The LIR may be a standard LIR (SLIR) or an emergency LIR (ELIR). The MLP LIR message may include a UE 105 identifier (e.g. a UE 105 IP address, a SUPI, PEI or Generic Public Subscription Identifier (GPSI)) and location data. The SLP 130 may authenticate the SUPL Agent 502 and check if the SUPL Agent 502 is authorized for the service it requests, based on a client-id received. Further, based on the received UE 105 identifier the SLP 130 may apply subscriber privacy against the client-id.

At stage B, the SLP 130 may determine routing information for the target UE 105. The SLP 130 may verify that the target UE 105 is currently not SUPL roaming and that the target UE 105 supports SUPL.

At stage C, the SLP 130 initiates a location session with the UE 105 by sending a SUPL INIT message to UE 105 (e.g. using IP and UDP). The SUPL INIT message contains at least a session-id, proxy/non-proxy mode indicator and an intended positioning method, which, in this example, is an uplink and/or uplink-downlink position method, such as UL-AOA, UL-TDOA, or multi-RTT. If the result of the privacy check in Step A indicates that notification or verification to the target subscriber is needed, the SLP 130 may also include a Notification element in the SUPL INIT message. Before the SUPL INIT message is sent, the SLP 130 may compute and store a hash of the message. For an emergency call, the SUPL INIT message may contain an E-SLP address if the SLP 130 is an E-SLP and is not the H-SLP for the UE 105. The SUPL INIT may also contain a desired Quality of Positioning (QoP). The SLP 130 may also include a Notification element in the SUPL INIT message indicating location for emergency services and, according to local regulatory requirements, whether notification or verification to the target UE 105 is or is not required.

At stage D, the UE 105 analyses the received SUPL INIT and takes needed action preparing for establishment or resumption of a secure connection between the UE 105 and the SLP 130. The UE 105 will also evaluate the Notification rules and follow the appropriate actions. The UE 105 further checks the proxy/non-proxy mode indicator to determine if the SLP 130 uses proxy or non-proxy mode. In this example, proxy mode is used, and the UE 105 establishes a secure TCP and Transport Layer Security (TLS) connection to the SLP 130 using an SLP address that has been provisioned by the Home Network to the UE 105 (or defaulted to an E-SLP address or an E-SLP address received in step C).

At stage E, the UE 105 sends a SUPL POS INIT message to SLP 130 to start a positioning session with the SLP 130 using LPP or LPP/LPPe messages. The UE 105 sends the SUPL POS INIT message even if the UE 105 supported positioning technologies do not include the intended positioning method indicated in the SUPL INIT message received at stage C. The SUPL POS INIT message may contain the following parameters: (i) a SET session ID which includes at least one of a SUPI, PEI, or 5G-TMSI for UE 105; (ii) UE 105 capabilities, (iii) a registered AMF identifier for a serving AMF 154 of UE 105; (iv) a hash of the received SUPL INIT message (ver); and (v) a Location ID (lid) parameter which includes a serving cell ID for UE 105, where the serving cell ID may include the ID of a serving gNB 110-1 for UE 105. The UE capabilities include the positioning methods supported by UE 105 (e.g., uplink and/or uplink-downlink position methods, such as UL-AOA, UL-TDOA, and/or multi-RTT) and associated positioning protocols supported by UE 105 (e.g., RRLP, RRC, TIA-801, LPP or LPP/LPPe). The UE 105 may provide network measurements specific for the radio technology being used. The UE 105 may provide its position if this is supported. The UE 105 may include a Requested Assistance Data element in the SUPL POS INIT. Parameters (i), (ii) and (iii) described above may include extensions for an extended SLP 130. Specifically, the inclusion of at least one of a SUPI, PEI, or 5G-TMSI for UE 105 in a SET session ID for (i), the indication of UL and/or DL position methods for (ii) and the registered AMF identifier for (iii) may not be supported when SUPL is not extended but may be supported by both the UE 105 and an extended SLP 130 when SUPL is extended.

Box 504 illustrates message exchanges for a general positioning procedure including, among other things, an NRPPa PDU transfer for UE associated signaling in box 506 and an NRPPa PDU transfer for non-UE associated signaling in box 508. At the conclusion of the message exchanges in box 504, the SLP 130 obtains a position estimate for the UE 105. Box 504 may be used by an SLP 130 to instigate UL PRS or UL SRS transmission by UE 105 to support UL location measurement by gNBs 110.

At stage F, which can be optional, UE 105 and SLP 130 engage in SUPL POS message exchanges using the LPP or LPP/LPPe protocol, which may occur throughout box 504. Based on the SUPL POS INIT message including posmethod(s) supported by the UE 105, the SLP 130 determines the posmethod(s) (e.g., uplink and/or uplink-downlink position methods). The UE 105 and SLP 130 then exchange LPP or LPP/LPPe messages (transferred inside SUP POS messages) to support any UL-DL position method(s). For example, SLP 130 can request and obtain DL measurements from UE 105 to support a UL-DL position method. Stage F may not occur when SLP 130 uses only UL position methods (e.g. UL-AOD and/or UL-TDOA).

At stage G, UE 105 and gNBs 110 exchange RRC messages or lower layer messages, such as MAC messages, for position measurements for uplink and/or uplink-downlink position methods, and may occur throughout box 504. For example, the serving gNB 110-1 may send an RRC message to UE 105 requesting that the UE 105 send uplink positioning signals, e.g., UL PRS (SRS for positioning), to be measured by the gNBs 110. The UE 105 may respond with an RRC message. The serving gNB 110-1 may also or instead send a MAC message to activate transmission of the UL PRS (or UL SRS) by the UE 105 and the UE 105 may transmit the UL PRS (or UL SRS), which is measured by one or more gNBs 110, such as the serving gNB 110-1 and possibly non-serving gNBs 110n. Similarly, message exchanges may be performed for the transmission of DL PRS from one or more gNBs 110, which is measured by the UE 105.

Box 506 generally illustrates an NRPPa PDU transfer between the SLP 130 and the serving gNB 110-1 for UE associated positioning of UE 105, which may occur throughout box 504. Here, SLP 130 may assign a Correlation ID as part of stage H, as opposed to the AMF 154. Additionally, a ueContextId parameter to identify the UE 105 to the AMF 154 for stage H is included at stage H by the SLP 130 as the SUPI, PEI, or 5G-TMSI received from the UE 105 at stage E. The SLP 130 also needs to know the serving AMF 154 for the UE 105 in order to instigate stages H-K, which is also obtained from UE 105 at stage E. The AMF 154 identifies the UE 105 from the ueContextId information (SUPI, PEI, or 5G-TMSI) received at stage H and converts this to NGAP IDs for UE 105 for NGAP Transport to the serving gNB 110-1 for UE 105 used at stage I. The SLP 130 exchanges UE associated NRPPa positioning messages with the serving gNB 110-1, through the serving AMF 154 using the identifier for the serving AMF, the identifier for the UE, and the Correlation ID at stages H-K as follows.

At stage H, the SLP 130 invokes the Namf_Communication_N1N2MessageTransfer service operation towards the serving AMF 154 for the UE 105 to request the transfer of a UE associated NRPPa Protocol Data Unit (PDU) to the serving gNB 110-1 for the UE 105. The SLP 130 assigns the Correlation ID and includes the NRPPa PDU together with the Correlation ID in the N2 Message Container. The service operation further includes the ueContextId, with SUPI/PEI or 5G-TMSI, as received at stage E.

At stage I, the AMF 154 forwards the NRPPa PDU to the serving gNB 110-1 in an NGAP Downlink UE Associated NRPPa Transport message over the NG signaling connection corresponding to the UE 105 and includes a Routing ID related to the SLP 130. The AMF 154 need not retain state information for this transfer—e.g. the AMF 154 can treat any response in stage J as a separate non-associated transfer.

Stages J and K are triggered when a serving gNB 110-1 needs to send a UE associated NRPPa message to the SLP 130 for the target UE 105 as part of an NRPPa positioning activity (e.g. as a response to an NRPPa message received at stage I). At stage J, the serving gNB 110-1 sends an NRPPa PDU to the AMF 154 in an NGAP Uplink UE Associated NRPPa Transport message and includes the Routing ID received in stage I.

At stage K, the AMF 154 invokes the Namf_Communication_N2InfoNotify service operation towards the SLP 130 indicated by the Routing ID received in stage J. The service operation includes the NRPPa PDU received in stage J together possibly with the Correlation ID and the ueContextId (e.g., SUPI, PEI or 5G-TMSI) in an N2 Info Container. The stages H to K in box 506 may be repeated and may be used by SLP 130 to instigate UL PRS (e.g. UL SRS) transmission by UE 105 to support UL and/or UL-DL position methods.

Box 508 generally illustrates an NRPPa PDU transfer for non-UE associated signaling between the SLP 130 and serving and/or non-serving gNBs 110-1 and 110n related to obtaining data and/or UL location measurements from the gNBs 110-1 and 110n for positioning support for UE 105. For example, the non-UE associated signaling in box 508 may be used by SLP 130 to: (i) request and obtain configuration information (e.g. timing, frequencies, bandwidth, angular direction, encoding, muting pattern) for DL PRS transmitted by one or more TPs 211 for each of one or more gNBs 110-1 and 110n; (ii) request transmission of DL PRS by one or more TPs 211 for each of the gNBs 110-1 and 110n according to DL PRS configuration information for each TP 211 provided by SLP 130 (e.g. timing, frequencies, bandwidth, angular direction, encoding, muting pattern); and/or (iii) request one or more RPs 213 in each of the gNBs 110-1 and 110n to obtain UL location measurements (e.g. for gNB Rx-Tx, TOA and/or UL-AOA) of UL PRS or UL SRS transmitted by UE 105 and provide the UL location measurements to SLP 130.

Stages L and M are triggered when the SLP 130 needs to send a non-UE associated NRPPa message to a non-serving gNB 110n or serving gNB 110-1 to request or to send data related to positioning of UE 105. At stage L, the SLP 130 invokes an Namf_Communication_NonUeN2MessageTransfer service operation towards the AMF 154 to request the transfer of an NRPPa PDU to a non-serving gNB 110n or serving gNB 110-1 in the NG-RAN 135, where the transfer is not explicitly associated with UE 105. The service operation includes the target NG-RAN node identity and the NRPPa PDU in an N2 Information Container.

At stage M, the AMF 154 forwards the NRPPa PDU to the identified non-serving gNB 110n or serving gNB 110-1 in an NGAP Downlink Non UE Associated NRPPa Transport message and includes a Routing ID identifying the SLP 130. The AMF 154 need not retain state information for this transfer—e.g. can treat any response in stage N as a separate non-associated transfer.

Stages N and O are triggered when a non-serving gNB 110n or serving gNB 110-1 needs to send an NRPPa PDU to the SLP 130 containing any data, UL location measurements or a confirmation of receipt of data or a request at stage M, and where the transfer is not explicitly associated with UE 105. At stage N, the gNB 110n or 110-1 sends an NRPPa PDU to the AMF 154 in an NGAP Uplink Non UE Associated NRPPa Transport message and includes the Routing ID received in stage M.

At stage O, the AMF 154 invokes the Namf_Communication_NonUeN2InfoNotify service operation towards the SLP 130 indicated by the Routing Identifier received in stage N. The service operation includes the NRPPa PDU received in stage N in an N2 Info Container.

The stages M to P in box 508 may be repeated (e.g. to allow SLP 130 to send non-UE associated NRPPa messages to other gNBs 110n or 110-1).

At stage P, following completion of all instances and repetitions of stages F-O, the SLP 130 calculates the position estimate for the UE 105 based on received positioning measurements (UE-Assisted) obtained at stages F, K and/or O, or the UE 105 calculates the position estimate (UE-Based) based on both DL location measurements obtained by the UE 105 and assistance data and/or UL location measurements received by the UE 105 from the SLP 130 at stages F and/or G and/or from the serving gNB 110-1 or other gNBs 110n at stage G. For UE based positioning, the UE 105 may transfer the calculated position estimate to the SLP 130 inside an LPP or LPP/LPPe message carried in a SUPL POS message (e.g. as a final message for stage F).

At stage Q, once the position calculation is complete, the SLP 130 sends a SUPL END message to the UE 105 informing it that no further positioning procedure will be started and that the location session is finished. The UE 105 then releases the secure connection to the SLP 130 and releases all resources related to this session.

At stage R, the SLP 130 sends the position estimate back to the SUPL Agent 502 in an MLP Location Immediate Answer (LIA) message, which may be a standard LIA (SLIA) or an emergency LIA (ELIA) and the SLP 130 releases all resources related to this session.

FIG. 6 shows a signaling flow illustrating a UE initiated SUPL session supporting at least one uplink or uplink-downlink position method. The signaling flow in FIG. 6 may be applicable to the UE 105 and SLP 130 in communication system 100 and may include a serving gNB 110-1 and one or more non-serving gNBs 110n. The serving gNB 110-1 and the non-serving gNBs 110n are sometimes collectively referred to as gNBs 110. The signaling flow may be applicable to a commercial location for a client internal to UE 105 or location for an emergency call. Accordingly, the SLP 130 may be an H-SLP or an E-SLP. For those services which originate from the UE 105, the SUPL agent resides within the UE 105.

At stage A, the SUPL agent on the UE 105 receives a request for a position of UE 105 from an application running on the UE 105, which may be, a commercial application or an application supporting an emergency call. The UE 105 or the SUPL Agent on the UE 105 then uses a known or default address for the SLP 130 (e.g. provisioned by the Home Network operator) to establish a secure data connection (e.g. using TCP and TLS) to the SLP 130.

At stage B, the UE 105 sends a SUPL START message to SLP 130 to start a positioning session with the SLP 130. The SUPL START message may include the following parameters: (i) a SET session ID which includes at least one of a SUPI, PEI, or 5G-TMSI for UE 105; (ii) UE 105 capabilities; and (iii) a Location ID (lid) parameter which includes a serving cell ID for UE 105, where the serving cell ID includes the ID of a serving gNB 110-1 for UE 105. The UE capabilities include the positioning methods supported by UE 105 (e.g., uplink and/or uplink-downlink position methods, such as UL-AOA, UL-TDOA, and/or multi-RTT) and associated positioning protocols (e.g., RRLP, RRC, TIA-801, LPP or LPP/LPPe).

At stage C, the SLP 130 may determine routing information for the target UE 105. The SLP 130 verifies that the target UE 105 is currently not SUPL roaming.

At stage D, consistent with the SUPL START message including posmethod(s) supported by the UE 105, the SLP 130 determines a position method (posmethod). If required for the posmethod, the SLP 130 uses the supported positioning protocol (e.g., RRLP, RRC, TIA-801, LPP or LPP/LPPe) from the SUPL START message for positioning of UE 105 at stage F. The SLP 130 responds by sending a SUPL RESPONSE message to the UE 105. The SUPL RESPONSE contains the determined posmethod (e.g., an uplink and/or uplink-downlink position method, such as UL-AOA, UL-TDOA, or multi-RTT).

Stages E through Q of the UE initiated SUPL session of FIG. 6 are the same as stages E through Q of the network initiated SUPL sessions described above in FIG. 5, with the difference that (i) for UE assisted positioning, the SLP 130 includes the calculated position estimate for UE 105 in the SUPL END message sent to UE 105 at stage Q, and (ii) for UE based positioning. the UE 105 may not necessarily send the calculated position estimate for UE 105 to the SLP 130. Following stage Q, the UE 105 or the SUPL Agent in UE 105 sends the calculated position estimate to the application running on UE 105 which requested the location at stage A.

FIG. 7 shows a signaling flow illustrating a network initiated or UE initiated SUPL session supporting an uplink-downlink position method, and in particular, multi-RTT positioning. The signaling flow in FIG. 7 may be applicable to the UE 105 and SLP 130 in communication system 100 and may include a serving gNB 110-1 and one or more non-serving gNBs 110*n*. The serving gNB 110-1 and the non-serving gNBs 110*n* are sometimes collectively referred to as gNBs 110. The signaling flow may be applicable to a commercial location for an external client or location for an emergency call. Accordingly, the SLP 130 may be an H-SLP or an E-SLP. In a network initiated SUPL session, the SUPL agent 702 may correspond to the external client 150 illustrated in FIG. 1, or for an emergency call, the SUPL agent 702 may correspond to a Public Safety Answering Point (PSAP) or a Location Retrieval Function (LRF) 153. In a UE initiated SUPL session, the SUPL agent resides within the UE 105 and SUPL agent 702 is not used.

Box 704 and box 706 illustrate message exchanges used for UE initiation and network initiation of the SUPL session, respectively. Thus, if the message exchanges shown in box 704 for UE initiation of the SUPL session occur, then the message exchanges shown in box 706 for network initiation of the SUPL session are excluded. Similarly, if the message exchanges shown in box 706 for network initiation of the SUPL session occur, then the message exchanges shown in box 704 for UE initiation of the SUPL session are excluded.

The message exchanges and other actions at stages A to D shown in box 704 of FIG. 7 are the same as the message exchanges and other actions described above for stages A to D in the UE initiated SUPL session shown in FIG. 6. Specifically, at stage A, the SUPL agent on the UE 105 receives a request for position from an application running on the UE 105, which may be, a commercial application or an application associated with an emergency call. The UE 105 takes appropriate action to establish or resuming a secure connection between the UE 105 and the SLP 130.

At stage B, the UE 105 sends a SUPL START message to start a positioning session with the SLP 130. The SUPL START message includes the parameters described above for stage B of FIG. 6.

At stage C, the SLP 130 may determine routing information for the target UE 105. The SLP 130 also verifies that the target UE 105 is currently not SUPL roaming.

At stage D, consistent with the SUPL START message including posmethod(s) supported by the UE 105, the SLP 130 determines a posmethod. If required for the posmethod, the SLP 130 uses the supported positioning protocol (e.g., RRLP, RRC, TIA-801, LPP or LPP/LPPe) from the SUPL START message. The SLP 130 responds by sending a SUPL RESPONSE message to the UE 105. The SUPL RESPONSE contains the determined posmethod (e.g., an uplink-downlink position method, such as multi-RTT).

The message exchanges and other actions at stages E to H shown in box 706 of FIG. 7 are the same as the message exchanges and other actions described above for stages A to D in the network initiated SUPL session shown in FIG. 5. Specifically, at stage E in FIG. 7, SUPL Agent 702 sends an OMA Mobile Location Protocol (MLP) Location Immediate Request (LIR) message to the SLP 130, with which SUPL Agent is associated. The LIR may be a standard LIR (SLIR) or an emergency LIR (ELIR). The MLP LIR message may include a UE 105 identifier (e.g. a UE 105 IP address, a SUPI, PEI or GPSI) and location data. The SLP 130 may authenticate the SUPL Agent 702 and check if the SUPL Agent 702 is authorized for the service it requests, based on a client-id received. Further, based on the received UE 105 identifier the SLP 130 may apply subscriber privacy against the client-id.

At stage F, the SLP 130 may determine routing information for the target UE 105. The SLP 130 may also verify that the target UE 105 is currently not SUPL roaming and that the target UE 105 supports SUPL.

At stage G, the SLP 130 initiates a location session with the UE 105 by sending a SUPL INIT message to UE 105 (e.g. using IP and UDP). The SUPL INIT message contains at least a session-id, proxy/non-proxy mode indicator and an intended positioning method, which, in this example, is an uplink-downlink position method, such as multi-RTT. If the result of the privacy check in Step E indicates that notification or verification to the target subscriber is needed, the SLP 130 may also include a Notification element in the SUPL INIT message. Before the SUPL INIT message is sent, the SLP 130 may compute and store a hash of the message. For an emergency call, the SUPL INIT message may contain an E-SLP address if the SLP 130 is an E-SLP and is not the H-SLP for the UE 105. The SUPL INIT may also contain a desired QoP. The SLP 130 may also include a Notification element in the SUPL INIT message indicating location for emergency services and, according to local regulatory requirements, whether notification or verification to the target UE 105 is or is not required.

At stage H, the UE 105 analyses the received SUPL INIT and takes needed action preparing for establishment or resumption of a secure connection between the UE 105 and the SLP 130. The UE 105 then establishes a secure TCP and TLS connection to the SLP 130 using an SLP address that has been provisioned by the Home Network to the UE 105 (or defaulted to an E-SLP address or an E-SLP address received in step G).

At stage I, similar to stage E shown in FIGS. 5 and 6, the UE 105 sends a SUPL POS INIT message to start a positioning session with the SLP 130 using LPP or LPP/LPPe messages. The UE 105 sends the SUPL POS INIT message even if the UE 105 supported positioning technologies do not include the intended positioning method indicated in the SUPL INIT message from stage G or the SUPL RESPONSE message from stage D. The SUPL POS INIT message may contain the following parameters: (i) a SET session ID which includes at least one of a SUPI, PEI, or 5G-TMSI for UE 105; (ii) UE 105 capabilities, (iii) a registered AMF identifier for a serving AMF 154 of UE 1051 (iv) a hash of the received SUPL INIT message when stage G occurs; and (v) a Location ID (lid) parameter which includes a serving cell ID for UE 105, where the serving cell ID may include the ID of a serving gNB 110-1 for UE 105. The UE capabilities include the positioning methods supported by UE 105 (e.g., uplink and/or uplink-downlink position methods, such as UL-AOA, UL-TDOA, and/or multi-RTT) and associated positioning protocols supported by UE 105 (e.g., RRLP, RRC, TIA-801, LPP or LPP/LPPe). The UE 105 may provide network measurements specific for the radio technology being used. The UE 105 may provide its position if this is supported. The UE 105 may include a Requested Assistance Data element in the SUPL POS INIT. Parameters (i), (ii) and (iii) described above may include extensions for an extended SLP 130 as described previously for stage E of FIG. 5.

Box 708 is similar to box 504 shown in FIGS. 5 and 6, but instead of illustrating a general positioning procedure applicable to many different positioning methods, box 708 illustrates the messaging between, and other actions performed by, the SLP 130, the gNBs 110, and the UE 105 to perform multi-RTT positioning.

At stage J, the SLP 130, AMF 154, and gNBs 110 perform an NRPPa DL PRS configuration information exchange required for multi-RTT positioning in which SLP 130 either sends DL PRS configuration information to gNBs 110 or requests already configured DL PRS configuration information from gNBs 110. The NRPPa DL PRS configuration information exchange at stage J, for example, is as illustrated in box 508 of FIGS. 5 and 6.

At stage K, the UE 105 and SLP 130 engage in SUPL POS message exchanges during which the SLP 130 may request the positioning capabilities of UE 105 using an LPP or LPP/LPPe Capability Transfer procedure. The SUPL POS message exchange of stage K, for example, may be a message exchange performed at stage F in FIGS. 5 and 6.

At stage L, the SLP 130 sends an NRPPa POSITIONING INFORMATION REQUEST message to the serving gNB 110-1 to instigate UL SRS or UL PRS transmission from UE 105 and request UL information for the target UE 105, which may be as described for stages H and I in box 506 of FIGS. 5 and 6.

At stage M, the serving gNB 110-1 determines the resources available for UL SRS or UL PRS transmission by UE 105.

At stage N, the serving gNB 110-1 configures the target UE 105 with the UL SRS or UL PRS resource sets. The determination of resources and configuring the UE 105 in stages M and N, for example, may be part of stage G in FIGS. 5 and 6.

At stage O, the serving gNB 110-1 provides the UL SRS (or ULP PRS) configuration information to the SLP 130 in an NRPPa POSITIONING INFORMATION RESPONSE message. The NRPPa POSITIONING INFORMATION RESPONSE message, for example, may be a message sent at stages J and K for box 506 of FIGS. 5 and 6.

At stage P, and in the case of semi-persistent or aperiodic UL SRS, the LMF 152 may request activation of UL SRS transmission by sending an NRPPa POSITIONING ACTIVATION REQUEST message to the serving gNB 110-1, which may be as described for stages H and I in box 506 of FIGS. 5 and 6.

At stage Q, the serving gNB 110-1 may activate the UL SRS or UL PRS transmission by the target UE 105, e.g., by sending a MAC message to UE 105. The target UE 105 then begins the UL SRS or UL PRS transmission according to the time domain behavior of UL SRS resource configuration. The activation of UL SRS or UL PRS transmission, for example, may be part of stage G in FIGS. 5 and 6. If stage P has occurred, the serving gNB 110-1 may also return an NRPPa POSITIONING ACTIVATION RESPONSE message to the LMF 152, as described for stages J and K in box 506 of FIGS. 5 and 6, to confirm activation of UL SRS or UL PRS in UE 105 and provide information about its occurrence.

At stage R, the SLP 130 provides the UL SRS or UL PRS information and a request for UL location measurements of this (e.g. gNB Rx-Tx and possibly AOA) to selected gNBs 110n and/or 110-1 in an NRPPa MEASUREMENT REQUEST message (with one message sent to each gNB 110), which may be as described for stages L and M of box 508 of FIGS. 5 and 6. Each NRPPa MEASUREMENT REQUEST message includes all information required to enable a gNB 110 and its TRPs 112 to perform the requested UL location measurements.

At stage S, the SLP 130 sends a SUPL POS message to the UE 105 containing an LPP or LPP/LPPe Provide Assistance Data message, e.g., as part of stage F of FIGS. 5 and 6. The message includes any required assistance data for the target UE 105 to perform DL PRS measurements needed to support multi-RTT.

At stage T, the SLP 130 sends a SUPL POS message to the UE 105 containing an LPP or LPP/LPPe Request Location Information message to request DL location measurements by UE 105 for multi-RTT (e.g. UE Rx-Tx and RSRP measurements) for DL PRS signals transmitted by gNBs 110 according to PRS configuration information provided by or to SLP 130 at stage J. For example, stage T may be part of stage F of FIGS. 5 and 6.

At stage U, the UE 105 performs the DL PRS measurements of DL PRS transmitted by gNBs 110 according to the request received at stage T and the assistance data received at stage S, which may be part of stage G of FIGS. 5 and 6. Each gNB 110 that received a request at stage R, and if able, measures the UL SRS or UL PRS transmission from the target UE 105 which was activated at stage Q, which may occur as part of block 508 (e.g. part of stage N) in FIGS. 5 and 6.

At stage V, the UE 105 sends the DL PRS measurements for multi-RTT, which were obtained at stage U, to the SLP 130 in an LPP or LPP/LPPe Provide Location Information message carried by a SUPL POS message. Stage V may be part of stage F in FIGS. 5 and 6.

At stage W, each gNB 110 which obtained UL location measurements at stage U sends the UL location measurements to the SLP 130 in an NRPPa MEASUREMENT RESPONSE message (one message per gNB 110). Stage W may be as described for stages N and O for box 508 in FIGS. 5 and 6.

At stage X, the SLP 130 sends an NRPPa POSITIONING DEACTIVATION message to the serving gNB 110-1 to deactivate UL SRS or UL PRS transmission or terminate all the transmission by the UE 105, which may be as described for stages H and I of box 506 of FIGS. 5 and 6. The serving gNB 110-1 may then deactivate or otherwise discontinue UL SRS transmission from UE 105 (e.g. by sending a request to UE 105 as at stage G for FIGS. 5 and 6 and not shown in FIG. 7).

At stage Y, the SLP 130 determines RTTs between the UE 105 and each gNB 110 for which UL location measurements were provided by the gNB 110 at stage W and for which DL location measurements were provided by UE 105 at stage V. For example, the RTTs may be determined as described for FIG. 3A. The SLP 130 then calculates the position of the target UE 105, e.g. as described for FIG. 3B and/or as described for FIG. 4A and/or FIG. 4B.

At stage Z, once the position calculation is complete the SLP 130 sends a SUPL END message to the UE 105 informing it that no further positioning procedure will be started and that the location session is finished. For a UE 105 initiated SUPL session, the SLP 130 also includes the calculated position for UE 105 in the SUPL END message. The UE 105 then releases the secure connection to the SLP 130 and releases all resources related to this session. For a network initiated SUPL session, the SLP 130 sends the position estimate back to the SUPL Agent 702 in an MLP Location Immediate Answer (LIA) message, which may be a standard LIA (SLIA) or an emergency LIA (ELIA) and the SLP 130 releases all resources related to this session.

Figure 8:
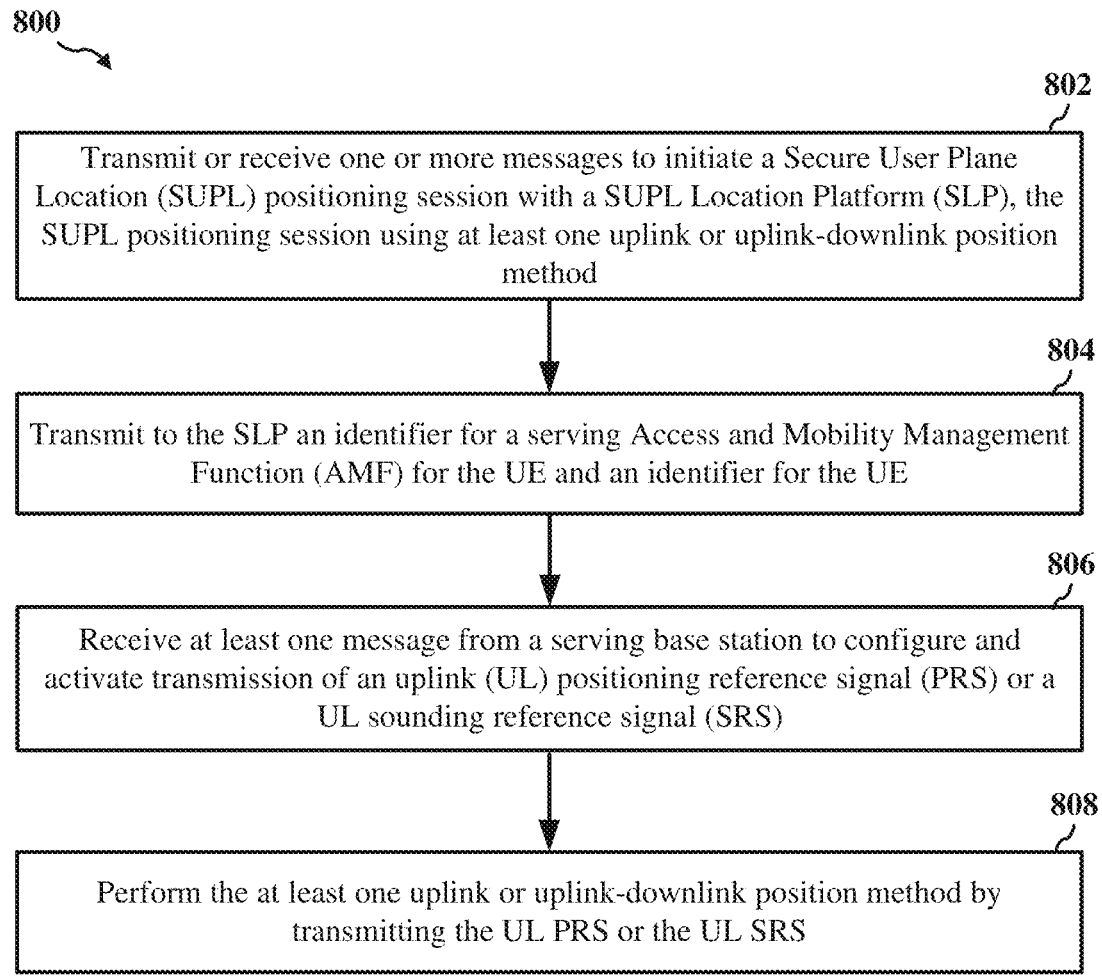
FIG. 8 shows a process flow illustrating a method performed by a UE for location services that include a SUPL session supporting at least one uplink or uplink-downlink position method.

FIG. 8 shows a process flow 800 illustrating a method of supporting location services for a user equipment (UE) that includes a SUPL session supporting at least one uplink or uplink-downlink position method. The process flow 800 may be performed by the UE, such as UE 105 in communication system 100.

At block 802, the UE transmits or receives one or more messages to initiate a Secure User Plane Location (SUPL) positioning session with a SUPL Location Platform (SLP), e.g., SLP 130 in communication system 100, where the SUPL positioning session uses at least one uplink or uplink-downlink position method, e.g., as shown in stages C and D in FIG. 5, stages A-D in FIG. 6, and stages A-D or stages G and H in FIG. 7.

At block 804, the UE transmits to the SLP an identifier for a serving Access and Mobility Management Function (e.g. AMF 154) for the UE and an identifier for the UE, e.g., as described for stage E in FIGS. 5 and 6 and stage I in FIG. 7.

At stage 806, the UE receives at least one message from a serving base station (e.g. a gNB 110-1) to configure and activate transmission of an uplink (UL) positioning reference signal (PRS) or a UL sounding reference signal (SRS), e.g. as described for stage G of FIGS. 5 and 6 and stages N and Q of FIG. 7.

At block 808, the UE performs the at least one uplink or uplink-downlink position method by transmitting the UL PRS or the UL SRS, e.g., as described for stage G in FIGS. 5 and 6, and stage Q in FIG. 7.

In one implementation, the at least one uplink or uplink-downlink position method may be multi-Round Trip signal propagation Time (RTT), Uplink Angle of Arrival (UL-AOA), Uplink Time Difference of Arrival (UL-TDOA), or some combination thereof, e.g., illustrated in FIGS. 3A, 3B, 4A, and 4B.

In one implementation, the transmission of the UL PRS or the UL SRS by the UE at block 808 is configured and activated by the serving base station in response to one or more requests from the SLP sent via the serving AMF for the UE using the identifier for the serving AMF and the identifier for the UE, e.g. as described for stages H and I of FIGS. 5 and 6 and stages L and P of FIG. 7. The one or more requests may comprise NRPPa messages.

In one implementation, transmitting or receiving the one or more messages to initiate the SUPL positioning session with the SLP may include transmitting a SUPL START message to the SLP indicating support for the at least one uplink or uplink-downlink position method, e.g., as shown in stage B of FIGS. 6 and 7, and receiving a SUPL RESPONSE message from the SLP indicating the at least one uplink or uplink-downlink position method, e.g., as shown in stage D of FIGS. 6 and 7.

In one implementation, transmitting or receiving the one or more messages to initiate the SUPL positioning session with the SLP may include receiving a SUPL INIT message from the SLP indicating the at least one uplink or uplink-downlink position method, e.g., as shown in stage C of FIG. 5 and stage G of FIG. 7.

In one implementation, the identifier for the serving AMF and the identifier for the UE are transmitted to the SLP in a SUPL POS INIT message, e.g., as shown in stage E of FIGS. 5 and 6 and stage I of FIG. 7.

In one implementation, the identifier for the UE may be at least one of a Subscriber Permanent Identifier (SUPI), a Permanent Equipment Identifier (PEI), or a 5G Temporary Mobile Subscriber Identity (5G-TMSI), e.g., as shown in stage E of FIGS. 5 and 6 and stage I of FIG. 7.

In one implementation, the identifier for the UE is included in a SUPL session identifier, e.g., as shown in stage E of FIGS. 5 and 6 and stage I of FIG. 7.

In one implementation, performing the at least one uplink or uplink-downlink position method may further comprise at least one of: receiving and measuring a downlink PRS transmitted by at least one base station (e.g. a gNB 110), e.g., as shown in stage F in FIGS. 5 and 6, and stage U in FIG. 7; or transmitting or receiving SUPL positioning messages (e.g. SUPL POS messages) to or from the SLP, e.g. as shown in in stage F in FIGS. 5 and 6, and stages K, S, T and V in FIG. 7.

In one implementation, each of the SUPL positioning messages transmitted or received to or from the SLP includes at least one message for a Long Term Evolution (LTE) Positioning Protocol (LPP) protocol or an LPP Extensions (LPPe) protocol, e.g., as shown in stage F in FIGS. 5 and 6, and stages K, S, T and V in FIG. 7.

Figure 9:
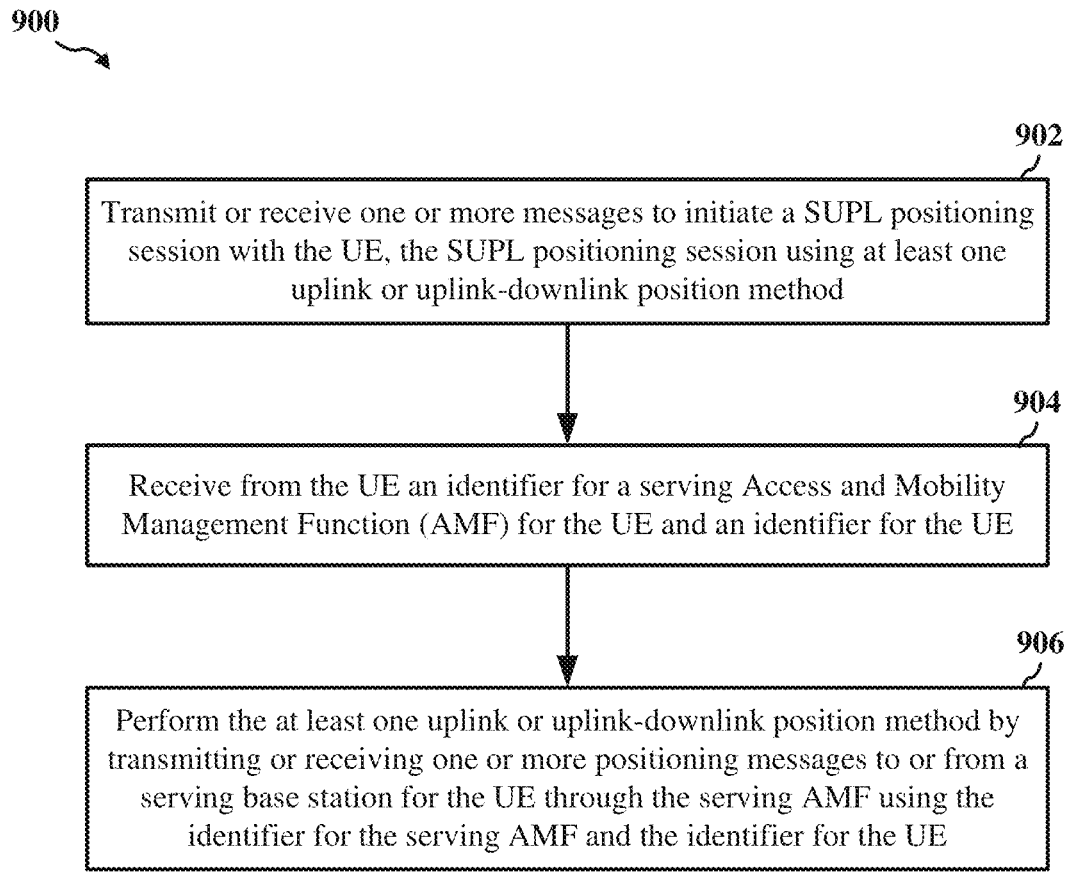
FIG. 9 shows a process flow illustrating a method performed by an SLP for location services that include a SUPL session supporting at least one uplink or uplink-downlink position method.

FIG. 9 shows a process flow 900 illustrating a method of supporting location services for a UE (e.g. the UE 105 in communication system 100) that includes a SUPL session supporting at least one uplink or uplink-downlink position method. The process flow 900 may be performed by an SLP, such as SLP 130 in communication system 100.

At block 902, the SLP transmits or receives one or more messages to initiate a SUPL positioning session with the UE, where the SUPL positioning session uses at least one uplink or uplink-downlink position method, e.g., as shown in stages C and D in FIG. 5, stages A-D in FIG. 6, and stages A-D or stages G and H in FIG. 7.

At block 904, the SLP receives from the UE an identifier for a serving Access and Mobility Management Function (e.g. AMF 154) for the UE and an identifier for the UE, e.g., as shown in stage E in FIGS. 5 and 6 and stage I in FIG. 7.

At block 906, the SLP performs the at least one uplink or uplink-downlink position method by transmitting or receiving one or more positioning messages to or from a serving base station for the UE (e.g. a gNB 110-1) through the serving AMF using the identifier for the serving AMF and the identifier for the UE, e.g., as shown in block 506 in FIGS. 5 and 6, and stages L, O, P, Q and X in FIG. 7.

In one implementation, the at least one uplink or uplink-downlink position method comprises multi-Round Trip signal propagation Time (RTT), Uplink Angle of Arrival (UL-AOA), Uplink Time Difference of Arrival (UL-TDOA), or some combination thereof, e.g., illustrated in FIGS. 3A, 3B, 4A, and 4B.

In one implementation, transmitting or receiving the one or more messages to initiate the SUPL positioning with the UE may include receiving a SUPL START message from the UE indicating support for the at least one uplink or uplink-downlink position method, e.g., as shown in stage B of FIGS. 6 and 7, and transmitting a SUPL RESPONSE message to the UE indicating the at least one uplink or uplink-downlink position method, e.g., as shown in stage D of FIGS. 6 and 7.

In one implementation, transmitting or receiving the one or more messages to initiate the SUPL positioning session with the UE may include transmitting a SUPL INIT message to the UE indicating the at least one uplink or uplink-downlink position method, e.g., as shown in stage C of FIG. 5 and stage G of FIG. 7.

In one implementation, the identifier for the serving AMF and the identifier for the UE are received from the UE in a SUPL POS INIT message, e.g., as shown in stage E of FIGS. 5 and 6 and stage I of FIG. 7.

In one implementation, the identifier for the UE is at least one of a Subscriber Permanent Identifier (SUPI), a Permanent Equipment Identifier (PEI), or a 5G Temporary Mobile Subscriber Identity (5G-TMSI), e.g., as shown in stage E of FIGS. 5 and 6 and stage I of FIG. 7.

In one implementation, the identifier for the UE is included in a SUPL session identifier, e.g., as shown in stage E of FIGS. 5 and 6 and stage I of FIG. 7.

In one implementation, the SLP may perform the at least one uplink or uplink-downlink position method by transmitting or receiving SUPL positioning messages (e.g. SUPL POS messages) to or from the UE, e.g. as shown in stage F in FIGS. 5 and 6, and stages K, S, T and V in FIG. 7. Each of the SUPL positioning messages transmitted or received to or from the UE may include at least one message for a Long Term Evolution (LTE) Positioning Protocol (LPP) protocol or an LPP Extensions (LPPe) protocol, e.g., as shown in stage F in FIGS. 5 and 6, and stages K, S, T and V in FIG. 7.

In one implementation, the SLP may further assign a correlation identifier, where transmitting or receiving the one or more positioning messages to or from the serving base station for the UE through the serving AMF further uses the correlation identifier, e.g., as described for stage H of FIGS. 5 and 6.

In one implementation, the one or more positioning messages may be New Radio (NR) Positioning Protocol A (NRPPa) messages, e.g., as shown in box 506 of FIGS. 5 and 6 and stages, L, O, P, Q and X of FIG. 7. In one example, the serving base station may configure and activate transmission of an uplink (UL) positioning reference signal (PRS) or a UL sounding reference signal (SRS) by the UE based on the one or more positioning messages, e.g., as shown in stages N and Q of FIG. 7.

Figure 10:
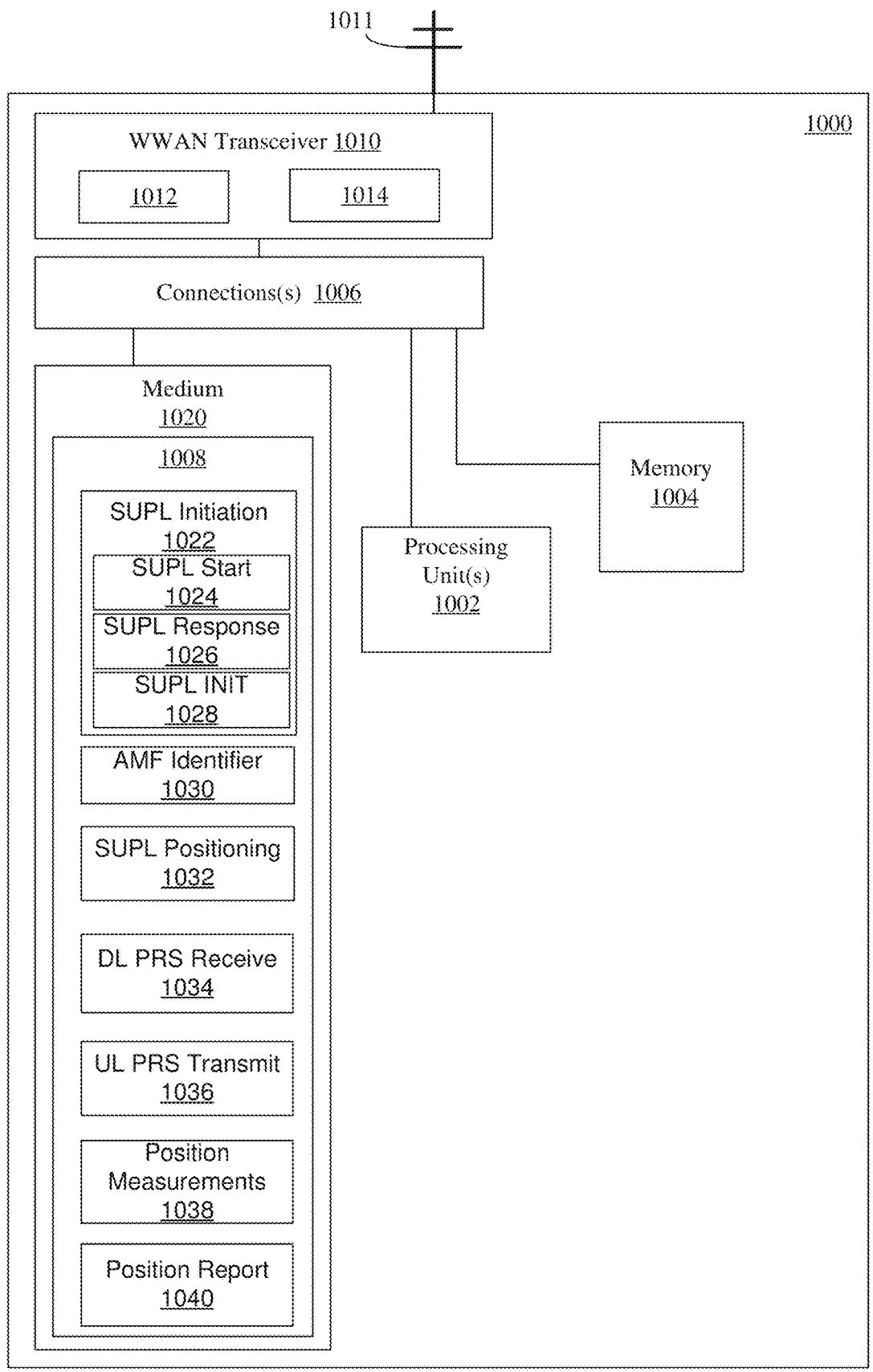
FIG. 10 is a diagram illustrating an example of a hardware implementation of UE configured for supporting location services as described herein.

FIG. 10 shows a schematic block diagram illustrating certain exemplary features of a UE 1000, e.g., which may be UE 105 shown in FIG. 1, enabled to support a SUPL positioning session for at least one uplink or uplink-downlink position method, as described herein. UE 1000 may, for example, include one or more processors 1002, memory 1004, an external interface such as at least one wireless transceiver 1010 (e.g., wireless network interface), which may be operatively coupled with one or more connections 1006 (e.g., buses, lines, fibers, links, etc.) to non-transitory computer readable medium 1020 and memory 1004. The computer readable medium 1020 may be stored in or otherwise a part of memory 1004 or may be completely or partially (or temporarily) external the memory 1004, and thus, may be considered inclusive, exclusive, or part of each. The UE 1000 may further include additional items, which are not shown, such as a user interface that may include e.g., a display, a keypad or other input device, such as virtual keypad on the display, through which a user may interface with the UE, or other types of receivers or transceivers, such as a Wireless Local Area Network (WLAN) transceiver, Bluetooth® transceiver, a satellite positioning system receiver, etc. In certain example implementations, all or part of UE 1000 may take the form of a chipset, and/or the like. Wireless transceiver 1010 may, for example, include a transmitter 1012 enabled to transmit one or more signals over one or more types of wireless communication networks and a receiver 1014 to receive one or more signals transmitted over the one or more types of wireless communication networks.

In some embodiments, UE 1000 may include antenna 1011, which may be internal or external. UE antenna 1011 may be used to transmit and/or receive signals processed by wireless transceiver 1010. In some embodiments, UE antenna 1011 may be coupled to wireless transceiver 1010. In some embodiments, measurements of signals received (transmitted) by UE 1000 may be performed at the point of connection of the UE antenna 1011 and wireless transceiver 1010. For example, the measurement point of reference for received (transmitted) RF signal measurements may be an input (output) terminal of the receiver 1014 (transmitter 1012) and an output (input) terminal of the UE antenna 1011. In a UE 1000 with multiple UE antennas 1011 or antenna arrays, the antenna connector may be viewed as a virtual point representing the aggregate output (input) of multiple UE antennas. In some embodiments, UE 1000 may measure received signals including signal strength and TOA measurements and the raw measurements may be processed by the one or more processors 1002.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of UE 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in UE 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in UE 1000 is merely exemplary, and as such the functionality of the modules and/or data structures may be combined, separated, and/or be structured in different ways depending upon the implementation of the UE 1000.

The medium 1020 and/or memory 1004 may include a SUPL initiation module 1022 that when implemented by the one or more processors 1002 configures the one or more processors 1002 to exchange messages, e.g., transmit or receive one or more messages, via the at least one wireless transceiver 1010, to initiate a SUPL positioning session with SLP, the SUPL positioning session using at least one uplink or uplink-downlink position method. For example, the SUPL initiation module 1022 may include a SUPL start module 1024 that when implemented by the one or more processors 1002 configures the one or more processors 1002 to transmit a SUPL START message, via the at least one wireless transceiver 1010, to the SLP indicating support for the at least one uplink or uplink-downlink position method. The SUPL initiation module 1022 may include a SUPL response module 1026 that when implemented by the one or more processors 1002 configures the one or more processors 1002 to receive a SUPL RESPONSE message, via the at least one wireless transceiver 1010, from the SLP indicating the at least one uplink or uplink-downlink position method. The SUPL initiation module 1022 may include a SUPL INIT module 1028 that when implemented by the one or more processors 1002 configures the one or more processors 1002 to receive a SUPL INIT message, via the at least one wireless transceiver 1010, from the SLP indicating the at least one uplink or uplink-downlink position method.

The medium 1020 and/or memory 1004 may include an AMF identifier module 1030 that when implemented by the one or more processors 1002 configures the one or more processors 1002 to transmit to the SLP, e.g., via the at least one wireless transceiver 1010, an identifier for a serving AMF for the UE and an identifier for the UE, in a LPP message contained in a SUPL POS INIT message.

The medium 1020 and/or memory 1004 may include a SUPL positioning module 1032 that when implemented by the one or more processors 1002 configures the one or more processors 1002 to perform the at least one uplink or uplink-downlink position method by exchanging SUPL positioning messages, e.g., receive one or more messages, via the at least one wireless transceiver 1010, from a serving base station to configure and activate transmission of an UL PRS or an UL SRS, and transmitting or receiving one or more SUPL positioning messages, to or from the SLP, via the at least one wireless transceiver 1010. The SUPL positioning messages transmitted or received with the SLP, for example, may include at least one message for a Long Term Evolution (LTE) Positioning Protocol (LPP) protocol.

The medium 1020 and/or memory 1004 may include a DL PRS receive module 1034 that when implemented by the one or more processors 1002 configures the one or more processors 1002 to receive, via the at least one wireless transceiver 1010, DL PRS transmitted by one or more base stations.

The medium 1020 and/or memory 1004 may include a UL PRS transmit module 1036 that when implemented by the one or more processors 1002 configures the one or more processors 1002 to transmit, via the wireless transceiver 1010, UL PRS or UL SRS for positioning.

The medium 1020 and/or memory 1004 may include a position measurement module 1038 that when implemented by the one or more processors 1002 configures the one or more processors 1002 to perform positioning measurements using received DL PRS and/or UL PRS. For example, the positioning measurements may be, e.g., uplink and/or uplink-downlink position methods such as UL-AOA, UL-TDOA, and multi-RTT, or some combination thereof.

The medium 1020 and/or memory 1004 may include a position report module 1040 that when implemented by the one or more processors 1002 configures the one or more processors 1002 to transmit location information, e.g., position measurements, to the SLP, via the at least one wireless transceiver 1010, e.g., in an LPP message contained in a SUPL positioning message.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support a SUPL positioning session for at least one uplink or uplink-downlink position method in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a wireless transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable code 1008 stored thereon, which if executed by one or more processors 1002 may be operatively enabled to perform all or portions of the example operations as described herein. Computer readable medium 1020 may be a part of memory 1004.

A UE, such as UE 1000, configured for supporting a SUPL positioning session for at least one uplink or uplink-downlink position method may include a means for transmitting or receiving one or more messages to initiate a Secure User Plane Location (SUPL) positioning session with a SUPL Location Platform (SLP), the SUPL positioning session using at least one uplink or uplink-downlink position method which may be, e.g., at least one wireless transceiver 1010 and one or more processors 1002 with dedicated hardware or implementing executable code or software instructions in memory 1004 or medium 1020 such as the SUPL Initiation module 1022. A means for transmitting to the SLP an identifier for a serving Access and Mobility Management Function (AMF) for the UE and an identifier for the UE may be, e.g., the at least one wireless transceiver 1010 and one or more processors 1002 with dedicated hardware or implementing executable code or software instructions in memory 1004 or medium 1020 such as the AMF identifier module 1030. A means for receiving at least one message from a serving base station to configure and activate transmission of an uplink (UL) positioning reference signal (PRS) or a UL sounding reference signal (SRS) may be, e.g., the at least one wireless transceiver 1010 and one or more processors 1002 with dedicated hardware or implementing executable code or software instructions in memory 1004 or medium 1020 such as the SUPL positioning module 1032. A means for performing the at least one uplink or uplink-downlink position method by transmitting the UL PRS or the UL SRS may be, e.g., the at least one wireless transceiver 1010 and one or more processors 1002 with dedicated hardware or implementing executable code or software instructions in memory 1004 or medium 1020 such as the SUPL positioning module 1032 and the UL PRS transmit module 1036.

In one implementation, the means for transmitting or receiving the one or more messages with the SLP to initiate the SUPL positioning session with the SLP may include a means for transmitting a SUPL START message to the SLP indicating support for the at least one uplink or uplink-downlink position method, which may be, e.g., at least one wireless transceiver 1010 and one or more processors 1002 with dedicated hardware or implementing executable code or software instructions in memory 1004 or medium 1020 such as the SUPL start module 1024. A means for receiving a SUPL RESPONSE message from the SLP indicating the at least one uplink or uplink-downlink position method may be, e.g., at least one wireless transceiver 1010 and one or more processors 1002 with dedicated hardware or implementing executable code or software instructions in memory 1004 or medium 1020 such as the SUPL response module 1026.

In one implementation, the means for transmitting or receiving the one or more messages to initiate the SUPL positioning session with the SLP UE may include a means for receiving a SUPL INIT message from the SLP indicating the at least one uplink or uplink-downlink position method, which may be, e.g., at least one wireless transceiver 1010 and one or more processors 1002 with dedicated hardware or implementing executable code or software instructions in memory 1004 or medium 1020 such as the SUPL INIT module 1028.

In one implementation, the means performing the at least one uplink or uplink-downlink position method may include one or more of a means for receiving and measuring a downlink PRS transmitted by at least one base station, which may be, e.g., at least one wireless transceiver 1010 and one or more processors 1002 with dedicated hardware or implementing executable code or software instructions in memory 1004 or medium 1020 such as the DL PRS receive module 1034 and position measurement module 1038; and a means for transmitting or receiving SUPL positioning messages with the SLP may be, e.g., the at least one wireless transceiver 1010 and one or more processors 1002 with dedicated hardware or implementing executable code or software instructions in memory 1004 or medium 1020 such as the SUPL positioning module 1032 and the UL PRS transmit module 1036.

Figure 11:
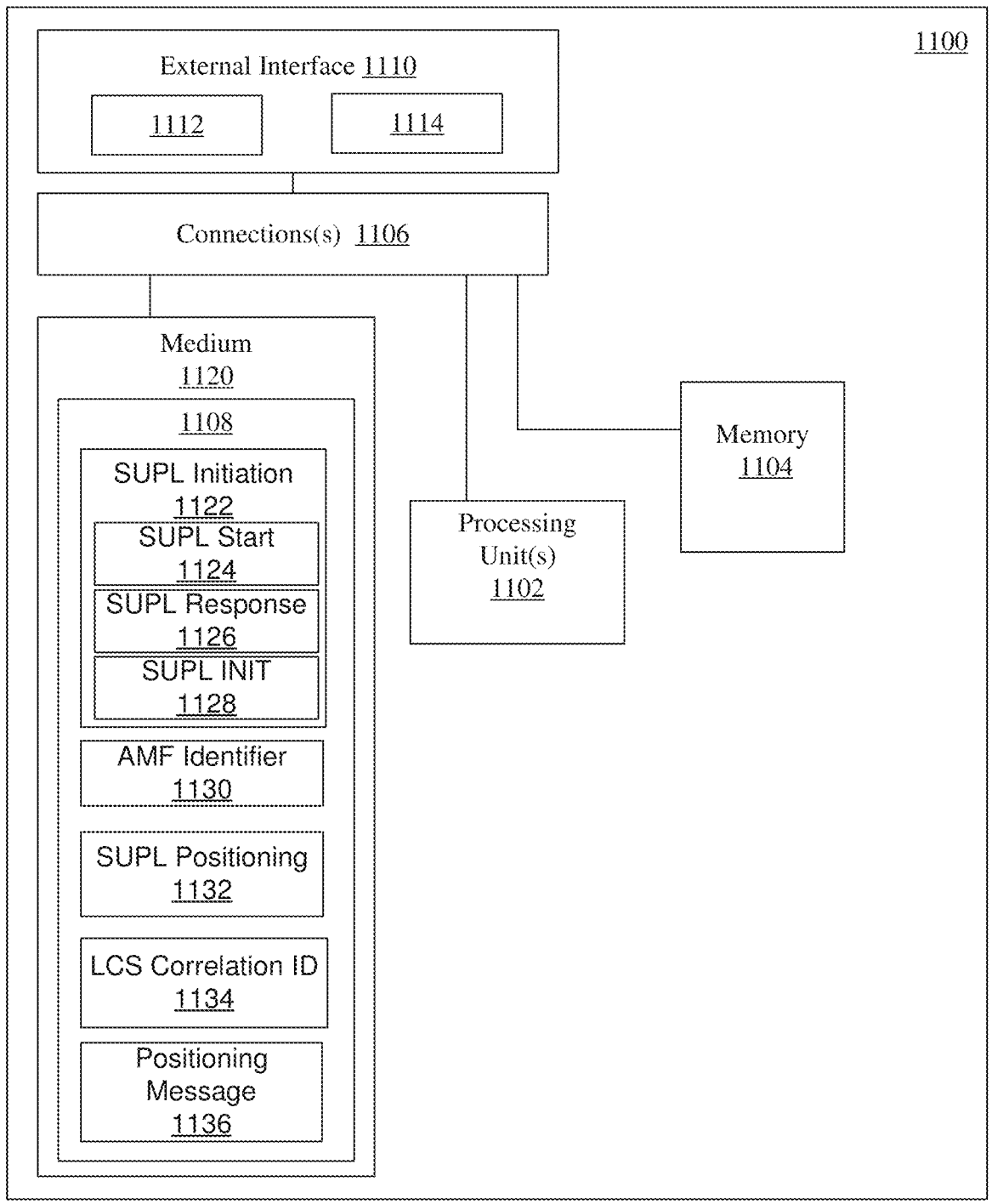
FIG. 11 is a diagram illustrating an example of a hardware implementation of a SLP configured for supporting location services for a UE as described herein.

FIG. 11 shows a schematic block diagram illustrating certain exemplary features of an SLP 1100, e.g., such as SLP 130 or an extended SLP 130 in FIG. 1, enabled to support a SUPL positioning session for at least one uplink or uplink-downlink position method, as described herein. SLP 1100 may, for example, include one or more processors 1102, memory 1104 and an external interface 1110 which may be a wireline or wireless network interface to other entities in a wireless communication system, which may be operatively coupled with one or more connections 1106 (e.g., buses, lines, fibers, links, etc.) to non-transitory computer readable medium 1120 and memory 1104. The computer readable medium 1120 may be stored in or otherwise a part of memory 1104 or may be completely or partially (or temporarily) external the memory 1104, and thus, may be considered inclusive, exclusive, or part of each. In certain example implementations, all or part of SLP 1100 may take the form of a chipset, and/or the like. External interface 1110 may, for example, include a transmitter 1112 enabled to transmit one or more signals over one or more types of communication networks and a receiver 1114 to receive one or more signals transmitted over the one or more types of communication networks.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of SLP 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in SLP 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in SLP 1100 is merely exemplary, and as such the functionality of the modules and/or data structures may be combined, separated, and/or be structured in different ways depending upon the implementation of the SLP 1100.

The medium 1120 and/or memory 1104 may include a SUPL initiation module 1122 that when implemented by the one or more processors 1102 configures the one or more processors 1102 to exchange messages, e.g., transmit or receive one or more messages, via external interface 1110, with the UE to initiate a SUPL positioning session, the SUPL positioning session using at least one uplink or uplink-downlink position method. For example, the SUPL initiation module 1122 may include a SUPL start module 1124 that when implemented by the one or more processors 1002 configures the one or more processors 1002 to receive, via external interface 1110, a SUPL START message from the UE indicating support for the at least one uplink or uplink-downlink position method. The SUPL initiation module 1122 may include a SUPL response module 1126 that when implemented by the one or more processors 1002 configures the one or more processors 1002 to transmit, via external interface 1110, a SUPL RESPONSE message to the UE indicating the at least one uplink or uplink-downlink position method. The SUPL initiation module 1122 may include a SUPL INIT module 1128 that when implemented by the one or more processors 1002 configures the one or more processors 1002 to transmit, via external interface 1110, a SUPL INIT message to the UE indicating the at least one uplink or uplink-downlink position method.

The medium 1120 and/or memory 1104 may include an AMF identifier module 1130 that when implemented by the one or more processors 1102 configures the one or more processors 1102 to receive from the UE, via the external interface, an identifier for a serving Access and Mobility Management Function (AMF) for the UE and an identifier for the UE.

The medium 1120 and/or memory 1104 may include a SUPL positioning module 1132 that when implemented by the one or more processors 1102 configures the one or more processors 1102 to perform the at least one uplink or uplink-downlink position method by exchanging, e.g., transmitting or receiving, via the external interface 1110, one or more positioning messages with a serving base station for the UE through the serving AMF, e.g., using an the identifier for the serving AMF and an identifier for the UE, and transmitting or receiving one or more, SUPL positioning messages to or from the UE, via the external interface 1110. The SUPL positioning messages transmitted or received with the SLP, for example, may include at least one message for a Long Term Evolution (LTE) Positioning Protocol (LPP) protocol.

The medium 1120 and/or memory 1104 may include an LCS correlation ID module 1134 that when implemented by the one or more processors 1102 configures the one or more processors 1102 to assign a Location Service (LCS) correlation identifier.

The medium 1120 and/or memory 1104 may include a positioning message module 1136 that when implemented by the one or more processors 1102 configures the one or more processors 1102 to exchange positioning messages, e.g., transmit or receive one or more positioning messages, via the external interface 1110, with a serving base station for the UE through the serving AMF using the identifier for the serving AMF, the identifier for the UE, and in some implementations, further using the LCS correlation identifier.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support TDOA measurements in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include an external interface 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

An SLP, such as SLP 1100, configured for supporting a SUPL positioning session for at least one uplink or uplink-downlink position method may include a means for transmitting or receiving one or more messages with the UE to initiate a SUPL positioning session, the SUPL positioning session using at least one uplink or uplink-downlink position method, which may be, e.g., the external interface 1110 and one or more processors 1102 with dedicated hardware or implementing executable code or software instructions in memory 1104 or medium 1120 such as the SUPL initiation module 1122. A means for receiving from the UE an identifier for a serving Access and Mobility Management Function (AMF) for the UE and an identifier for the UE may be, e.g., the external interface 1110 and one or more processors 1102 with dedicated hardware or implementing executable code or software instructions in memory 1104 or medium 1120 such as the AMF identifier module 1130. A means for performing the at least one uplink or uplink-downlink position method by transmitting or receiving one or more positioning messages to or from a serving base station for the UE through the serving AMF using the identifier for the serving AMF and the identifier for the UE may be, e.g., the external interface 1110 and one or more processors 1102 with dedicated hardware or implementing executable code or software instructions in memory 1104 or medium 1120 such as the positioning message module 1136.

In one implementation, the means for transmitting or receiving the one or more messages with the UE to initiate the SUPL positioning session may include means for receiving a SUPL START message from the UE indicating support for the at least one uplink or uplink-downlink position method, which may be, e.g., the external interface 1110 and one or more processors 1102 with dedicated hardware or implementing executable code or software instructions in memory 1104 or medium 1120 such as the SUPL start module 1124. A means for transmitting a SUPL RESPONSE message to the UE indicating the at least one uplink or uplink-downlink position method may be, e.g., the external interface 1110 and one or more processors 1102 with dedicated hardware or implementing executable code or software instructions in memory 1104 or medium 1120 such as the SUPL response module 1126. A means for transmitting a SUPL INIT message to the UE indicating the at least one uplink or uplink-downlink position method may be, e.g., the external interface 1110 and one or more processors 1102 with dedicated hardware or implementing executable code or software instructions in memory 1104 or medium 1120 such as the SUPL INIT module 1128.

In one implementation, the means for performing the at least one uplink or uplink-downlink position method may comprise a means for transmitting or receiving SUPL positioning messages to or from the UE which may be, e.g., the external interface 1110 and one or more processors 1102 with dedicated hardware or implementing executable code or software instructions in memory 1104 or medium 1120 such as the SUPL positioning module 1132. The SUPL positioning messages transmitted or received with the UE, for example, may include at least one message for a Long Term Evolution (LTE) Positioning Protocol (LPP) protocol or an LPP Extensions (LPPe) protocol.

In one implementation, the SLP may include a means for assigning a correlation identifier, which may be, e.g., the one or more processors 1102 with dedicated hardware or implementing executable code or software instructions in memory 1104 or medium 1120 such as the LCS correlation ID module 1134. The means for transmitting or receiving one or more positioning messages with the serving base station for the UE through the serving AMF may further use the correlation identifier.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method performed by a user equipment (UE) for supporting location services for the UE, the method comprising:
transmitting or receiving one or more messages to initiate a Secure User Plane Location (SUPL) positioning session with a SUPL Location Platform (SLP), the SUPL positioning session using at least one uplink or uplink-downlink position method;
transmitting to the SLP an identifier for a serving Access and Mobility Management Function (AMF) for the UE and an identifier for the UE;
receiving at least one message from a serving base station to configure and activate transmission of an uplink (UL) positioning reference signal (PRS) or a UL sounding reference signal (SRS); and
performing the at least one uplink or uplink-downlink position method by transmitting the UL PRS or the UL SRS.

2. The method of clause 1, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

3. The method of either of clauses 1 or 2, wherein the transmission of the UL PRS or the UL SRS by the UE is configured and activated by the serving base station in response to one or more requests from the SLP sent via the serving AMF for the UE using the identifier for the serving AMF and the identifier for the UE.

4. The method of clause 3, wherein the one or more requests comprise New Radio Positioning Protocol A (NRPPa) messages.

5. The method of any of clauses 1-4, wherein transmitting or receiving the one or more messages to initiate the SUPL positioning session with the SLP comprises:
transmitting a SUPL START message to the SLP indicating support for the at least one uplink or uplink-downlink position method; and
receiving a SUPL RESPONSE message from the SLP indicating the at least one uplink or uplink-downlink position method.

6. The method of any of clauses 1-5, wherein transmitting or receiving the one or more messages to initiate the SUPL positioning session with the SLP comprises:
receiving a SUPL INIT message from the SLP indicating the at least one uplink or uplink-downlink position method.

7. The method of any of clauses 1-6, wherein the identifier for the serving AMF and the identifier for the UE are transmitted to the SLP in a SUPL POS INIT message.

8. The method of any of clauses 1-7, wherein the identifier for the UE is at least one of a Subscriber Permanent Identifier (SUPI), a Permanent Equipment Identifier (PEI), or a 5G Temporary Mobile Subscriber Identity (5G-TMSI).

9. The method of any of clauses 1-8, wherein the identifier for the UE is included in a SUPL session identifier.

10. The method of any of clauses 1-9, wherein performing the at least one uplink or uplink-downlink position method further comprises at least one of:
receiving and measuring a downlink PRS transmitted by at least one base station; or
transmitting or receiving SUPL positioning messages to or from the SLP.

11. The method of clause 10, wherein each of the SUPL positioning messages transmitted or received to or from the SLP includes at least one message for a Long Term Evolution (LTE) Positioning Protocol (LPP) protocol or an LPP Extensions (LPPe) protocol.

12. A user equipment (UE) configured for supporting location services for the UE, the UE comprising:

at least one wireless transceiver configured to wirelessly communicate with a wireless network;

at least one memory; and at least one processor coupled to the at least one wireless transceiver and the at least one memory, the at least one processor configured to:

transmit or receive one or more messages, via the at least one wireless transceiver, to initiate a Secure User Plane Location (SUPL) positioning session with a SUPL Location Platform (SLP), the SUPL positioning session using at least one uplink or uplink-downlink position method;

transmit to the SLP, via the at least one wireless transceiver, an identifier for a serving Access and Mobility Management Function (AMF) for the UE and an identifier for the UE;

receive at least one message from a serving base station to configure and activate transmission of an uplink (UL) positioning reference signal (PRS) or a UL sounding reference signal (SRS); and perform the at least one uplink or uplink-downlink position method by transmitting the UL PRS or the UL SRS.

13. The UE of clause 12, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

14. The UE of either of clauses 12 or 13, wherein the transmission of the UL PRS or the UL SRS by the UE is configured and activated by the serving base station in response to one or more requests from the SLP sent via the serving AMF for the UE using the identifier for the serving AMF and the identifier for the UE.

15. The UE of clause 14, wherein the one or more requests comprise New Radio Positioning Protocol A (NRPPa) messages.

16. The UE of any of clauses 12-15, wherein the at least one processor is configured to transmit or receive the one or more messages to initiate the SUPL positioning session with the SLP by being configured to:

transmit, via the at least one wireless transceiver, a SUPL START message to the SLP indicating support for the at least one uplink or uplink-downlink position method; and receive, via the at least one wireless transceiver, a SUPL RESPONSE message from the SLP indicating the at least one uplink or uplink-downlink position method.

17. The UE of any of clauses 12-16, wherein the at least one processor is configured to transmit or receive the one or more messages to initiate the SUPL positioning session with the SLP by being configured to:

receive, via the at least one wireless transceiver, a SUPL INIT message from the SLP indicating the at least one uplink or uplink-downlink position method.

18. The UE of any of clauses 12-17, wherein the identifier for the serving AMF and the identifier for the UE are transmitted to the SLP in a SUPL POS INIT message.

19. The UE of any of clauses 12-18, wherein the identifier for the UE is at least one of a Subscriber Permanent Identifier (SUPI), a Permanent Equipment Identifier (PEI), or a 5G Temporary Mobile Subscriber Identity (5G-TMSI).

20. The UE of any of clauses 12-19, wherein the identifier for the UE is included in a SUPL session identifier.

21. The UE of any of clauses 12-20, wherein the at least one processor is configured to perform the at least one uplink or uplink-downlink position method by being configured to:

receive, via the at least one wireless transceiver, and measure a downlink PRS transmitted by at least one base station; or transmit or receive, via the at least one wireless transceiver, SUPL positioning messages to or from the SLP.

22. The UE of clause 21, wherein each of the SUPL positioning messages transmitted or received to or from the SLP includes at least one message for a Long Term Evolution (LTE) Positioning Protocol (LPP) protocol.

23. A user equipment (UE) configured for supporting location services for the UE, the UE comprising:

means for transmitting or receiving one or messages to initiate a Secure User Plane Location (SUPL) positioning session with a SUPL Location Platform (SLP), the SUPL positioning session using at least one uplink or uplink-downlink position method;

means for transmitting to the SLP an identifier for a serving Access and Mobility Management Function (AMF) for the UE and an identifier for the UE;

means for receiving at least one message from a serving base station to configure and activate transmission of an uplink (UL) positioning reference signal (PRS) or a UL sounding reference signal (SRS); and means for performing the at least one uplink or uplink-downlink position method by transmitting the UL PRS or the UL SRS.

24. The UE of clause 23, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

25. The UE of either of clauses 23 or 24, wherein the transmission of the UL PRS or the UL SRS by the UE is configured and activated by the serving base station in response to one or more requests from the SLP sent via the serving AMF for the UE using the identifier for the serving AMF and the identifier for the UE.

26. The UE of clause 25, wherein the one or more requests comprise New Radio Positioning Protocol A (NRPPa) messages.

27. The UE of any of clauses 23-26, wherein the means for transmitting or receiving the one or more messages to initiate the SUPL positioning session with the SLP comprises:

means for transmitting a SUPL START message to the SLP indicating support for the at least one uplink or uplink-downlink position method; and means for receiving a SUPL RESPONSE message from the SLP indicating the at least one uplink or uplink-downlink position method.

28. The UE of any of clauses 23-27, wherein the means for transmitting or receiving the one or more messages to initiate the SUPL positioning session with the SLP comprises:

means for receiving a SUPL INIT message from the SLP indicating the at least one uplink or uplink-downlink position method.

29. The UE of any of clauses 23-28, wherein the identifier for the serving AMF and the identifier for the UE are transmitted to the SLP in a SUPL POS INIT message.

30. The UE of any of clauses 23-29, wherein the identifier for the UE is at least one of a Subscriber Permanent Identifier (SUPI), a Permanent Equipment Identifier (PEI), or a 5G Temporary Mobile Subscriber Identity (5G-TMSI).

31. The UE of any of clauses 23-30, wherein the identifier for the UE is included in a SUPL session identifier.

32. The UE of any of clauses 23-31, wherein the means for performing the at least one uplink or uplink-downlink position method further comprises at least one of:
 means for receiving and measuring a downlink PRS transmitted by at least one base station; or
 means for transmitting or receiving SUPL positioning messages to or from the SLP.

33. The UE of clause 32, wherein each of the SUPL positioning messages transmitted or received to or from the SLP includes at least one message for a Long Term Evolution (LTE) Positioning Protocol (LPP) protocol or an LPP Extensions (LPPe) protocol.

34. A non-transitory storage medium including program code stored thereon, the program code is operable to configure at least one processor in a user equipment (UE) for supporting location services for the UE, the program code comprising instructions to:
 transmit or receive one or messages to initiate a Secure User Plane Location (SUPL) positioning session with a SUPL Location Platform (SLP), the SUPL positioning session using at least one uplink or uplink-downlink position method;
 transmit to the SLP an identifier for a serving Access and Mobility Management Function (AMF) for the UE and an identifier for the UE;
 receive at least one message from a serving base station to configure and activate transmission of an uplink (UL) positioning reference signal (PRS) or a UL sounding reference signal (SRS); and
 perform the at least one uplink or uplink-downlink position method by transmitting the UL PRS or the UL SRS.

35. The non-transitory storage medium of clause 34, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

36. The non-transitory storage medium of either of clauses 34 or 35, wherein the transmission of the UL PRS or the UL SRS by the UE is configured and activated by the serving base station in response to one or more requests from the SLP sent via the serving AMF for the UE using the identifier for the serving AMF and the identifier for the UE.

37. The non-transitory storage medium of clause 36, wherein the one or more requests comprise New Radio Positioning Protocol A (NRPPa) messages.

38. The non-transitory storage medium of any of clauses 34-37, wherein the instructions to transmit or receive the one or more messages to initiate the SUPL positioning session with the SLP further comprise instructions to:
 transmit a SUPL START message to the SLP indicating support for the at least one uplink or uplink-downlink position method; and
 receive a SUPL RESPONSE message from the SLP indicating the at least one uplink or uplink-downlink position method.

39. The non-transitory storage medium of any of clauses 34-38, wherein the instructions to transmit or receive the one or more messages to initiate the SUPL positioning session with the SLP further comprise instructions to:
 receive a SUPL INIT message from the SLP indicating the at least one uplink or uplink-downlink position method.

40. The non-transitory storage medium of any of clauses 34-39, wherein the identifier for the serving AMF and the identifier for the UE are transmitted to the SLP in a SUPL POS INIT message.

41. The non-transitory storage medium of any of clauses 34-40, wherein the identifier for the UE is at least one of a Subscriber Permanent Identifier (SUPI), a Permanent Equipment Identifier (PEI), or a 5G Temporary Mobile Subscriber Identity (5G-TMSI).

42. The non-transitory storage medium of any of clauses 34-41, wherein the identifier for the UE is included in a SUPL session identifier.

43. The non-transitory storage medium of any of clauses 34-42, wherein the instructions to perform the at least one uplink or uplink-downlink position method comprises at least one of:
 instructions to receive and measure a downlink PRS transmitted by at least one base station; or
 instructions to transmit or receive SUPL positioning messages to or from the SLP.

44. The non-transitory storage medium of clause 43, wherein each of the SUPL positioning messages transmitted or received to or from the SLP includes at least one message for a Long Term Evolution (LTE) Positioning Protocol (LPP) protocol or an LPP Extensions (LPPe) protocol.

45. A method performed by a Secure User Plane Location (SUPL) Location Platform (SLP) for supporting location services for a user equipment (UE), the method comprising:
 transmitting or receiving one or more messages to initiate a SUPL positioning session with the UE, the SUPL positioning session using at least one uplink or uplink-downlink position method;
 receiving from the UE an identifier for a serving Access and Mobility Management Function (AMF) for the UE and an identifier for the UE; and
 performing the at least one uplink or uplink-downlink position method by transmitting or receiving one or more positioning messages to or from a serving base station for the UE through the serving AMF using the identifier for the serving AMF and the identifier for the UE.

46. The method of clause 45, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

47. The method of either of clauses 45 or 46, wherein transmitting or receiving the one or more messages to initiate the SUPL positioning with the UE comprises:
 receiving a SUPL START message from the UE indicating support for the at least one uplink or uplink-downlink position method; and
 transmitting a SUPL RESPONSE message to the UE indicating the at least one uplink or uplink-downlink position method.

48. The method of any of clauses 45-47, wherein transmitting or receiving the one or more messages to initiate the SUPL positioning session with the UE comprises:
 transmitting a SUPL INIT message to the UE indicating the at least one uplink or uplink-downlink position method.

49. The method of any of clauses 45-48, wherein the identifier for the serving AMF and the identifier for the UE are received from the UE in a SUPL POS INIT message.

50. The method of any of clauses 45-49, wherein the identifier for the UE is at least one of a Subscriber Permanent Identifier (SUPI), a Permanent Equipment Identifier (PEI), or a 5G Temporary Mobile Subscriber Identity (5G-TMSI).

51. The method of any of clauses 45-50, wherein the identifier for the UE is included in a SUPL session identifier.

52. The method of any of clauses 45-51, further comprising performing the at least one uplink or uplink-downlink position method by transmitting or receiving SUPL positioning messages to or from the UE.

53. The method of clause 52, wherein each of the SUPL positioning messages transmitted or received to or from the UE includes at least one message for a Long Term Evolution (LTE) Positioning Protocol (LPP) protocol or an LPP Extensions (LPPe) protocol.

54. The method of any of clauses 45-53, further comprising assigning a correlation identifier, wherein transmitting or receiving the one or more positioning messages to or from the serving base station for the UE through the serving AMF further uses the correlation identifier.

55. The method of any of clauses 45-54, wherein the one or more positioning messages are New Radio (NR) Positioning Protocol A (NRPPa) messages.

56. The method of any of clauses 45-55, wherein the serving base station configures and activates transmission of an uplink (UL) positioning reference signal (PRS) or a UL sounding reference signal (SRS) by the UE based on the one or more positioning messages.

57. A Secure User Plane Location (SUPL) Location Platform (SLP) configured for supporting location services for a user equipment (UE), the SLP comprising:
at least one external interface configured to communicate with entities in a wireless network;
at least one memory; and
at least one processor coupled to the at least one external interface and the at least one memory, the at least one processor configured to:
transmit or receive, via the at least one external interface, one or more messages to initiate a SUPL positioning session with the UE, the SUPL positioning session using at least one uplink or uplink-downlink position method;
receive, via the at least one external interface, from the UE an identifier for a serving Access and Mobility Management Function (AMF) for the UE and an identifier for the UE; and
perform, via the at least one external interface, the at least one uplink or uplink-downlink position method by transmitting or receiving one or more positioning messages to or from a serving base station for the UE through the serving AMF using the identifier for the serving AMF and the identifier for the UE.

58. The SLP of clause 57, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

59. The SLP of either of clauses 57 or 58, wherein the at least one processor is configured to transmit or receive the one or more messages to initiate the SUPL positioning with the UE by being configured to:
receive, via the at least one external interface, a SUPL START message from the UE indicating support for the at least one uplink or uplink-downlink position method; and
transmit, via the at least one external interface, a SUPL RESPONSE message to the UE indicating the at least one uplink or uplink-downlink position method.

60. The SLP of any of clauses 57-59, wherein the at least one processor is configured to transmit or receive the one or more messages to initiate the SUPL positioning session with the UE by being configured to:
transmit, via the at least one external interface, a SUPL INIT message to the UE indicating the at least one uplink or uplink-downlink position method.

61. The SLP of any of clauses 57-60, wherein the identifier for the serving AMF and the identifier for the UE are received from the UE in a SUPL POS INIT message.

62. The SLP of any of clauses 57-61, wherein the identifier for the UE is at least one of a Subscriber Permanent Identifier (SUPI), a Permanent Equipment Identifier (PEI), or a 5G Temporary Mobile Subscriber Identity (5G-TMSI).

63. The SLP of any of clauses 57-62, wherein the identifier for the UE is included in a SUPL session identifier.

64. The SLP of any of clauses 57-63, wherein the at least one processor is further configured to perform the at least one uplink or uplink-downlink position method by transmitting or receiving SUPL positioning messages to or from the UE.

65. The SLP of clause 64, wherein each of the SUPL positioning messages transmitted or received to or from the UE include at least one message for a Long Term Evolution (LTE) Positioning Protocol (LPP) protocol.

66. The SLP of any of clauses 57-65, wherein the at least one processor is further configured to assign a correlation identifier, wherein the at least one processor is configured to transmit or receive the one or more positioning messages to or from the serving base station for the UE through the serving AMF using the correlation identifier.

67. The SLP of any of clauses 57-66, wherein the one or more positioning messages are New Radio (NR) Positioning Protocol A (NRPPa) messages.

68. The SLP of any of clauses 57-67, wherein the serving base station configures and activates transmission of an uplink (UL) positioning reference signal (PRS) or a UL sounding reference signal (SRS) by the UE based on the one or more positioning messages.

69. A Secure User Plane Location (SUPL) Location Platform (SLP) configured for supporting location services for a user equipment (UE), the SLP comprising:
means for transmitting or receiving one or more messages to initiate a SUPL positioning session with the UE, the SUPL positioning session using at least one uplink or uplink-downlink position method;
means for receiving from the UE an identifier for a serving Access and Mobility Management Function (AMF) for the UE and an identifier for the UE; and
means for performing the at least one uplink or uplink-downlink position method by transmitting or receiving one or more positioning messages to or from a serving base station for the UE through the serving AMF using the identifier for the serving AMF and the identifier for the UE.

70. The SLP of clause 69, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

71. The SLP of either of clauses 69 or 70, wherein the means for transmitting or receiving the one or more messages to initiate the SUPL positioning with the UE comprises:
means for receiving a SUPL START message from the UE indicating support for the at least one uplink or uplink-downlink position method; and
means for transmitting a SUPL RESPONSE message to the UE indicating the at least one uplink or uplink-downlink position method.

72. The SLP of any of clauses 69-71, wherein the means for transmitting or receiving the one or more messages to initiate the SUPL positioning session with the UE comprises:

means for transmitting a SUPL INIT message to the UE indicating the at least one uplink or uplink-downlink position method.

73. The SLP of any of clauses 69-72, wherein the identifier for the serving AMF and the identifier for the UE are received from the UE in a SUPL POS INIT message.

74. The SLP of any of clauses 69-73, wherein the identifier for the UE is at least one of a Subscriber Permanent Identifier (SUPI), a Permanent Equipment Identifier (PEI), or a 5G Temporary Mobile Subscriber Identity (5G-TMSI).

75. The SLP of any of clauses 69-74, wherein the identifier for the UE is included in a SUPL session identifier.

76. The SLP of any of clauses 69-75, wherein the means for performing the at least one uplink or uplink-downlink position method comprises means for transmitting or receiving SUPL positioning messages to or from the UE.

77. The SLP of clause 76, wherein each of the SUPL positioning messages transmitted or received to or from the UE include at least one message for a Long Term Evolution (LTE) Positioning Protocol (LPP) protocol or an LPP Extensions (LPPe) protocol.

78. The SLP of any of clauses 69-77, further comprising means for assigning a correlation identifier, wherein the means for transmitting or receiving the one or more positioning messages to or from the serving base station for the UE through the serving AMF further uses the correlation identifier.

79. The SLP of any of clauses 69-78, wherein the one or more positioning messages are New Radio (NR) Positioning Protocol A (NRPPa) messages.

80. The SLP of any of clauses 69-79, wherein the serving base station configures and activates transmission of an uplink (UL) positioning reference signal (PRS) or a UL sounding reference signal (SRS) by the UE based the one or more positioning messages.

81. A non-transitory storage medium including program code stored thereon, the program code is operable to configure at least one processor in a Secure User Plane Location (SUPL) Location Platform (SLP) configured for supporting location services for a user equipment (UE), the program code comprising instructions to:

transmit or receive one or more messages to initiate a SUPL positioning session with the UE, the SUPL positioning session using at least one uplink or uplink-downlink position method;

receive from the UE an identifier for a serving Access and Mobility Management Function (AMF) for the UE and an identifier for the UE; and perform the at least one uplink or uplink-downlink position method by transmitting or receiving one or more positioning messages to or from a serving base station for the UE through the serving AMF using the identifier for the serving AMF and the identifier for the UE.

82. The non-transitory storage medium of clause 81, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

83. The non-transitory storage medium of either of clauses 81 or 82, wherein the instruction to transmit or receive the one or more messages to initiate the SUPL positioning with the UE further comprise instructions to:

receiving a SUPL START message from the UE indicating support for the at least one uplink or uplink-downlink position method; and transmitting a SUPL RESPONSE message to the UE indicating the at least one uplink or uplink-downlink position method.

84. The non-transitory storage medium of any of clauses 81-83, wherein the instruction to transmit or receive the one or more messages to initiate the SUPL positioning session with the UE further comprise instructions to:

transmitting a SUPL INIT message to the UE indicating the at least one uplink or uplink-downlink position method.

85. The non-transitory storage medium of any of clauses 81-84, wherein the identifier for the serving AMF and the identifier for the UE are received from the UE in a SUPL POS INIT message.

86. The non-transitory storage medium of any of clauses 81-85, wherein the identifier for the UE is at least one of a Subscriber Permanent Identifier (SUPI), a Permanent Equipment Identifier (PEI), or a 5G Temporary Mobile Subscriber Identity (5G-TMSI).

87. The non-transitory storage medium of any of clauses 81-86, wherein the identifier for the UE is included in a SUPL session identifier.

88. The non-transitory storage medium of any of clauses 81-87, further comprising instructions to perform the at least one uplink or uplink-downlink position method by transmitting or receiving SUPL positioning messages to or from the UE.

89. The non-transitory storage medium of clause 88, wherein each of the SUPL positioning messages transmitted or received to or from the UE include at least one message for a Long Term Evolution (LTE) Positioning Protocol (LPP) protocol or an LPP Extensions (LPPe) protocol.

90. The non-transitory storage medium of any of clauses 81-89, further comprising instructions to assign a correlation identifier, wherein the instructions to transmit or receive the one or more positioning messages to or from the serving base station for the UE through the serving AMF further use the correlation identifier.

91. The non-transitory storage medium of any of clauses 81-90, wherein the one or more positioning messages are New Radio (NR) Positioning Protocol A (NRPPa) messages.

92. The non-transitory storage medium of any of clauses 81-91, wherein the serving base station configures and activates transmission of an uplink (UL) positioning reference signal (PRS) or a UL sounding reference signal (SRS) by the UE based on the one or more positioning messages.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for supporting location services for the UE, the method comprising:

transmitting or receiving one or more messages to initiate a Secure User Plane Location (SUPL) positioning session with a SUPL Location Platform (SLP), the SUPL positioning session using at least one uplink or uplink-downlink position method;

transmitting to the SLP an identifier for a serving Access and Mobility Management Function (AMF) for the UE and an identifier for the UE;

receiving at least one message from a serving base station to configure and activate transmission of an uplink (UL) positioning reference signal (PRS) or a UL sounding reference signal (SRS); and performing the at least one uplink or uplink-downlink position method by transmitting the UL PRS or the UL SRS.

2. The method of claim 1, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

3. The method of claim 1, wherein the transmission of the UL PRS or the UL SRS by the UE is configured and activated by the serving base station in response to one or more requests from the SLP sent via the serving AMF for the UE using the identifier for the serving AMF and the identifier for the UE.

4. The method of claim 3, wherein the one or more requests comprise New Radio Positioning Protocol A (NRPPa) messages.

5. The method of claim 1, wherein transmitting or receiving the one or more messages to initiate the SUPL positioning session with the SLP comprises:
transmitting a SUPL START message to the SLP indicating support for the at least one uplink or uplink-downlink position method; and
receiving a SUPL RESPONSE message from the SLP indicating the at least one uplink or uplink-downlink position method.

6. The method of claim 1, wherein transmitting or receiving the one or more messages to initiate the SUPL positioning session with the SLP comprises:
receiving a SUPL INIT message from the SLP indicating the at least one uplink or uplink-downlink position method.

7. The method of claim 1, wherein the identifier for the serving AMF and the identifier for the UE are transmitted to the SLP in a SUPL POS INIT message.

8. The method of claim 1, wherein the identifier for the UE is at least one of a Subscriber Permanent Identifier (SUPI), a Permanent Equipment Identifier (PEI), or a 5G Temporary Mobile Subscriber Identity (5G-TMSI).

9. The method of claim 1, wherein the identifier for the UE is included in a SUPL session identifier.

10. The method of claim 1, wherein performing the at least one uplink or uplink-downlink position method further comprises at least one of:
receiving and measuring a downlink PRS transmitted by at least one base station; or
transmitting or receiving SUPL positioning messages to or from the SLP.

11. The method of claim 10, wherein each of the SUPL positioning messages transmitted or received to or from the SLP includes at least one message for a Long Term Evolution (LTE) Positioning Protocol (LPP) protocol or an LPP Extensions (LPPe) protocol.

12. A user equipment (UE) configured for supporting location services for the UE, the UE comprising:
at least one wireless transceiver configured to wirelessly communicate with a wireless network;
at least one memory; and
at least one processor coupled to the at least one wireless transceiver and the at least one memory, the at least one processor configured to:
transmit or receive one or more messages, via the at least one wireless transceiver, to initiate a Secure User Plane Location (SUPL) positioning session with a SUPL Location Platform (SLP), the SUPL positioning session using at least one uplink or uplink-downlink position method;
transmit to the SLP, via the at least one wireless transceiver, an identifier for a serving Access and Mobility Management Function (AMF) for the UE and an identifier for the UE;
receive at least one message from a serving base station to configure and activate transmission of an uplink (UL) positioning reference signal (PRS) or a UL sounding reference signal (SRS); and
perform the at least one uplink or uplink-downlink position method by transmitting the UL PRS or the UL SRS.

13. The UE of claim 12, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

14. The UE of claim 12, wherein the transmission of the UL PRS or the UL SRS by the UE is configured and activated by the serving base station in response to one or more requests from the SLP sent via the serving AMF for the UE using the identifier for the serving AMF and the identifier for the UE.

15. The UE of claim 14, wherein the one or more requests comprise New Radio Positioning Protocol A (NRPPa) messages.

16. The UE of claim 12, wherein the at least one processor is configured to transmit or receive the one or more messages to initiate the SUPL positioning session with the SLP by being configured to:
transmit, via the at least one wireless transceiver, a SUPL START message to the SLP indicating support for the at least one uplink or uplink-downlink position method; and
receive, via the at least one wireless transceiver, a SUPL RESPONSE message from the SLP indicating the at least one uplink or uplink-downlink position method.

17. The UE of claim 12, wherein the at least one processor is configured to transmit or receive the one or more messages to initiate the SUPL positioning session with the SLP by being configured to:
receive, via the at least one wireless transceiver, a SUPL INIT message from the SLP indicating the at least one uplink or uplink-downlink position method.

18. The UE of claim 12, wherein the identifier for the serving AMF and the identifier for the UE are transmitted to the SLP in a SUPL POS INIT message.

19. The UE of claim 12, wherein the identifier for the UE is at least one of a Subscriber Permanent Identifier (SUPI), a Permanent Equipment Identifier (PEI), or a 5G Temporary Mobile Subscriber Identity (5G-TMSI).

20. The UE of claim 12, wherein the identifier for the UE is included in a SUPL session identifier.

21. The UE of claim 12, wherein the at least one processor is configured to perform the at least one uplink or uplink-downlink position method by being configured to:
receive, via the at least one wireless transceiver, and measure a downlink PRS transmitted by at least one base station; or
transmit or receive, via the at least one wireless transceiver, SUPL positioning messages to or from the SLP.

22. The UE of claim 21, wherein each of the SUPL positioning messages transmitted or received to or from the SLP includes at least one message for a Long Term Evolution (LTE) Positioning Protocol (LPP) protocol.

23. A user equipment (UE) configured for supporting location services for the UE, the UE comprising:
　means for transmitting or receiving one or messages to initiate a Secure User Plane Location (SUPL) positioning session with a SUPL Location Platform (SLP), the SUPL positioning session using at least one uplink or uplink-downlink position method;
　means for transmitting to the SLP an identifier for a serving Access and Mobility Management Function (AMF) for the UE and an identifier for the UE;
　means for receiving at least one message from a serving base station to configure and activate transmission of an uplink (UL) positioning reference signal (PRS) or a UL sounding reference signal (SRS); and
　means for performing the at least one uplink or uplink-downlink position method by transmitting the UL PRS or the UL SRS.

24. The UE of claim 23, wherein the means for transmitting or receiving the one or more messages to initiate the SUPL positioning session with the SLP comprises:
　means for transmitting a SUPL START message to the SLP indicating support for the at least one uplink or uplink-downlink position method; and
　means for receiving a SUPL RESPONSE message from the SLP indicating the at least one uplink or uplink-downlink position method.

25. The UE of claim 23, wherein the means for transmitting or receiving the one or more messages to initiate the SUPL positioning session with the SLP comprises:
　means for receiving a SUPL INIT message from the SLP indicating the at least one uplink or uplink-downlink position method.

26. A non-transitory storage medium including program code stored thereon, the program code is operable to configure at least one processor in a user equipment (UE) for supporting location services for the UE, the program code comprising instructions to:
　transmit or receive one or messages to initiate a Secure User Plane Location (SUPL) positioning session with a SUPL Location Platform (SLP), the SUPL positioning session using at least one uplink or uplink-downlink position method;
　transmit to the SLP an identifier for a serving Access and Mobility Management Function (AMF) for the UE and an identifier for the UE;
　receive at least one message from a serving base station to configure and activate transmission of an uplink (UL) positioning reference signal (PRS) or a UL sounding reference signal (SRS); and
　perform the at least one uplink or uplink-downlink position method by transmitting the UL PRS or the UL SRS.

27. A method performed by a Secure User Plane Location (SUPL) Location Platform (SLP) for supporting location services for a user equipment (UE), the method comprising:
　transmitting or receiving one or more messages to initiate a SUPL positioning session with the UE, the SUPL positioning session using at least one uplink or uplink-downlink position method;
　receiving from the UE an identifier for a serving Access and Mobility Management Function (AMF) for the UE and an identifier for the UE; and
　performing the at least one uplink or uplink-downlink position method by transmitting or receiving one or more positioning messages to or from a serving base station for the UE through the serving AMF using the identifier for the serving AMF and the identifier for the UE.

28. The method of claim 27, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

29. The method of claim 27, wherein transmitting or receiving the one or more messages to initiate the SUPL positioning with the UE comprises:
　receiving a SUPL START message from the UE indicating support for the at least one uplink or uplink-downlink position method; and
　transmitting a SUPL RESPONSE message to the UE indicating the at least one uplink or uplink-downlink position method.

30. The method of claim 27, wherein transmitting or receiving the one or more messages to initiate the SUPL positioning session with the UE comprises:
　transmitting a SUPL INIT message to the UE indicating the at least one uplink or uplink-downlink position method.

31. The method of claim 27, wherein the identifier for the serving AMF and the identifier for the UE are received from the UE in a SUPL POS INIT message.

32. The method of claim 27, wherein the identifier for the UE is at least one of a Subscriber Permanent Identifier (SUPI), a Permanent Equipment Identifier (PEI), or a 5G Temporary Mobile Subscriber Identity (5G-TMSI).

33. The method of claim 27, wherein the identifier for the UE is included in a SUPL session identifier.

34. The method of claim 27, further comprising performing the at least one uplink or uplink-downlink position method by transmitting or receiving SUPL positioning messages to or from the UE.

35. The method of claim 34, wherein each of the SUPL positioning messages transmitted or received to or from the UE includes at least one message for a Long Term Evolution (LTE) Positioning Protocol (LPP) protocol or an LPP Extensions (LPPe) protocol.

36. The method of claim 27, further comprising assigning a correlation identifier, wherein transmitting or receiving the one or more positioning messages to or from the serving base station for the UE through the serving AMF further uses the correlation identifier.

37. The method of claim 27, wherein the one or more positioning messages are New Radio (NR) Positioning Protocol A (NRPPa) messages.

38. The method of claim 27, wherein the serving base station configures and activates transmission of an uplink (UL) positioning reference signal (PRS) or a UL sounding reference signal (SRS) by the UE based on the one or more positioning messages.

39. A Secure User Plane Location (SUPL) Location Platform (SLP) configured for supporting location services for a user equipment (UE), the SLP comprising:
　at least one external interface configured to communicate with entities in a wireless network;
　at least one memory; and
　at least one processor coupled to the at least one external interface and the at least one memory, the at least one processor configured to:
　　transmit or receive, via the at least one external interface, one or more messages to initiate a SUPL positioning session with the UE, the SUPL positioning session using at least one uplink or uplink-downlink position method;

receive, via the at least one external interface, from the UE an identifier for a serving Access and Mobility Management Function (AMF) for the UE and an identifier for the UE; and perform, via the at least one external interface, the at least one uplink or uplink-downlink position method by transmitting or receiving one or more positioning messages to or from a serving base station for the UE through the serving AMF using the identifier for the serving AMF and the identifier for the UE.

40. The SLP of claim 39, wherein the at least one uplink or uplink-downlink position method comprises multi-Round Trip Time (RTT), Uplink Angle of Arrival (UL-AOA), Uplink Time Difference of Arrival (UL-TDOA), or some combination thereof.

41. The SLP of claim 39, wherein the at least one processor is configured to transmit or receive the one or more messages to initiate the SUPL positioning with the UE by being configured to:

receive, via the at least one external interface, a SUPL START message from the UE indicating support for the at least one uplink or uplink-downlink position method; and transmit, via the at least one external interface, a SUPL RESPONSE message to the UE indicating the at least one uplink or uplink-downlink position method.

42. The SLP of claim 39, wherein the at least one processor is configured to transmit or receive the one or more messages to initiate the SUPL positioning session with the UE by being configured to:

transmit, via the at least one external interface, a SUPL INIT message to the UE indicating the at least one uplink or uplink-downlink position method.

43. The SLP of claim 39, wherein the identifier for the serving AMF and the identifier for the UE are received from the UE in a SUPL POS INIT message.

44. The SLP of claim 39, wherein the identifier for the UE is at least one of a Subscriber Permanent Identifier (SUPI), a Permanent Equipment Identifier (PEI), or a 5G Temporary Mobile Subscriber Identity (5G-TMSI).

45. The SLP of claim 39, wherein the identifier for the UE is included in a SUPL session identifier.

46. The SLP of claim 39, wherein the at least one processor is further configured to perform the at least one uplink or uplink-downlink position method by transmitting or receiving SUPL positioning messages to or from the UE.

47. The SLP of claim 46, wherein each of the SUPL positioning messages transmitted or received to or from the UE include at least one message for a Long Term Evolution (LTE) Positioning Protocol (LPP) protocol.

48. The SLP of claim 39, wherein the at least one processor is further configured to assign a correlation identifier, wherein the at least one processor is configured to transmit or receive the one or more positioning messages to or from the serving base station for the UE through the serving AMF using the correlation identifier.

49. The SLP of claim 39, wherein the one or more positioning messages are New Radio (NR) Positioning Protocol A (NRPPa) messages.

50. The SLP of claim 39, wherein the serving base station configures and activates transmission of an uplink (UL) positioning reference signal (PRS) or a UL sounding reference signal (SRS) by the UE based on the one or more positioning messages.

51. A Secure User Plane Location (SUPL) Location Platform (SLP) configured for supporting location services for a user equipment (UE), the SLP comprising:

means for transmitting or receiving one or more messages to initiate a SUPL positioning session with the UE, the SUPL positioning session using at least one uplink or uplink-downlink position method;

means for receiving from the UE an identifier for a serving Access and Mobility Management Function (AMF) for the UE and an identifier for the UE; and means for performing the at least one uplink or uplink-downlink position method by transmitting or receiving one or more positioning messages to or from a serving base station for the UE through the serving AMF using the identifier for the serving AMF and the identifier for the UE.

52. The SLP of claim 51, wherein the means for transmitting or receiving the one or more messages to initiate the SUPL positioning with the UE comprises:

means for receiving a SUPL START message from the UE indicating support for the at least one uplink or uplink-downlink position method; and means for transmitting a SUPL RESPONSE message to the UE indicating the at least one uplink or uplink-downlink position method.

53. The SLP of claim 51, wherein the means for transmitting or receiving the one or more messages to initiate the SUPL positioning session with the UE comprises:

means for transmitting a SUPL INIT message to the UE indicating the at least one uplink or uplink-downlink position method.

54. A non-transitory storage medium including program code stored thereon, the program code is operable to configure at least one processor in a Secure User Plane Location (SUPL) Location Platform (SLP) configured for supporting location services for a user equipment (UE), the program code comprising instructions to:

transmit or receive one or more messages to initiate a SUPL positioning session with the UE, the SUPL positioning session using at least one uplink or uplink-downlink position method;

receive from the UE an identifier for a serving Access and Mobility Management Function (AMF) for the UE and an identifier for the UE; and perform the at least one uplink or uplink-downlink position method by transmitting or receiving one or more positioning messages to or from a serving base station for the UE through the serving AMF using the identifier for the serving AMF and the identifier for the UE.

* * * * *